(12) United States Patent
Imakura et al.

(10) Patent No.: US 11,034,178 B2
(45) Date of Patent: Jun. 15, 2021

(54) THERMAL TRANSFER SHEET

(71) Applicant: Dai Nippon Printing Co., Ltd., Tokyo (JP)

(72) Inventors: Yoshihiro Imakura, Tokyo (JP); Ryoji Hattori, Tokyo (JP); Yasuyuki Shouji, Tokyo (JP); Kazuya Yoshida, Tokyo (JP); Tomohiko Imoda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 238 days.

(21) Appl. No.: 16/088,597

(22) PCT Filed: Mar. 30, 2017

(86) PCT No.: PCT/JP2017/013467
§ 371 (c)(1),
(2) Date: Sep. 26, 2018

(87) PCT Pub. No.: WO2017/170963
PCT Pub. Date: Oct. 5, 2017

(65) Prior Publication Data
US 2019/0143641 A1   May 16, 2019

(30) Foreign Application Priority Data
Mar. 31, 2016  (JP) ............................. JP2016-073433

(51) Int. Cl.
*B41M 5/44* (2006.01)
*B41M 7/00* (2006.01)
*B32B 7/06* (2019.01)

(52) U.S. Cl.
CPC .............. *B41M 5/443* (2013.01); *B32B 7/06* (2013.01); *B41M 5/44* (2013.01); *B41M 7/0027* (2013.01);
(Continued)

(58) Field of Classification Search
CPC .... B41M 5/44; B41M 5/443; B41M 2205/10; B41M 2205/32; B41M 2205/38
See application file for complete search history.

(56) References Cited

U.S. PATENT DOCUMENTS 6,043,194 A    3/2000   Saito et al.
6,308,630 B1  10/2001   Kurokawa et al.
(Continued)

FOREIGN PATENT DOCUMENTS

EP   1 129 862 A1    9/2001
JP   H05-065560 U    8/1993
(Continued)

OTHER PUBLICATIONS

Machine translation of detailed description of JP2014-198435 acquired on Aug. 30, 2020.*

(Continued)

*Primary Examiner* — Gerard Higgins
(74) *Attorney, Agent, or Firm* — Burr & Brown, PLLC

(57) ABSTRACT

There is provided a thermal transfer sheet having satisfactory peelability when a transfer layer is peeled off without being affected by a peeling environment when the transfer layer is peeled off.
A thermal transfer sheet 100 includes a substrate 1 and a transfer layer 10 provided on one surface of the substrate 1, in which the peeling force in a stable period is in the range of 4.6 g/cm or more and 23 g/cm or less when the transfer layer 10 is peeled off at a peeling temperature in the range of 30° C. or more and 70° C. or less and at a peeling angle of 90° while the surface of the transfer layer 10 on the side opposite to the substrate 1 is made to serve as a peeling interface.

9 Claims, 2 Drawing Sheets

(52) U.S. Cl.
CPC .... *B32B 2307/748* (2013.01); *B41M 2205/10* (2013.01); *B41M 2205/32* (2013.01); *B41M 2205/38* (2013.01)

(56) References Cited

U.S. PATENT DOCUMENTS

| | | | |
|---|---|---|---|
| 6,673,744 | B1 | 1/2004 | Taguchi et al. |
| 2002/0197453 | A1 | 12/2002 | Usuki et al. |
| 2003/0035935 | A1 | 2/2003 | Wachi et al. |
| 2009/0303307 | A1* | 12/2009 | Yasumatsu ............. B44C 1/172 347/221 |
| 2012/0242773 | A1 | 9/2012 | Yasumatsu |
| 2016/0067997 | A1 | 3/2016 | Oomura et al. |

FOREIGN PATENT DOCUMENTS

| | | |
|---|---|---|
| JP | H09-290576 A1 | 11/1997 |
| JP | H11-058963 A1 | 3/1999 |
| JP | H11-151867 A1 | 6/1999 |
| JP | H11-263079 A1 | 9/1999 |
| JP | 2001-246845 A1 | 9/2001 |
| JP | 2002-079766 A1 | 3/2002 |
| JP | 2002-337469 A1 | 11/2002 |
| JP | 2006-095982 A1 | 4/2006 |
| JP | 2011-068004 A1 | 4/2011 |
| JP | 2012-066530 A1 | 4/2012 |
| JP | 2012-201013 A1 | 10/2012 |
| JP | 2012-245720 A1 | 12/2012 |
| JP | 2014-198435 A1 | 10/2014 |
| JP | 2015-085554 A1 | 5/2015 |
| WO | 2018/021384 A1 | 2/2018 |

OTHER PUBLICATIONS

Korean Office Action (Application No. 10-2018-7028871) dated Jan. 17, 2020 (with English translation).
International Search Report and Written Opinion (Application No. PCT/JP2017/013467) dated Jun. 13, 2017.
Extended European Search Report (Application No. 17775496.7) dated Mar. 14, 2019.

* cited by examiner

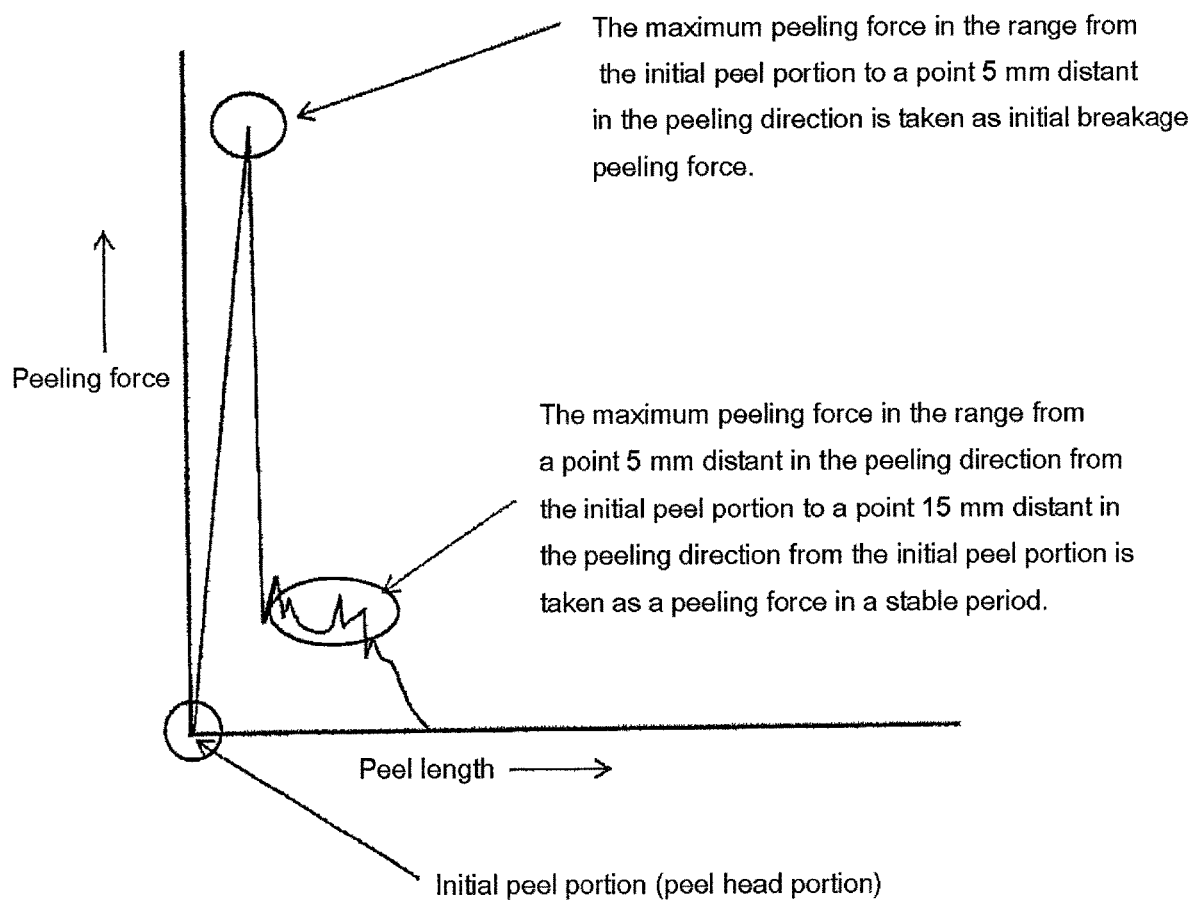

THERMAL TRANSFER SHEET

TECHNICAL FIELD

The present invention relates to a thermal transfer sheet.

BACKGROUND ART

There are known various types of thermal transfer sheets for transferring a transfer layer onto a transfer receiving article. For example, thermal transfer sheets suggested in Patent Literatures 1 to 3 are known, such as: (i) a thermal transfer sheet in which a receiving layer as a transfer layer is provided on one surface of a substrate (it is referred to as an intermediate transfer medium, occasionally), (ii) a thermal transfer sheet in which a protective layer (it is referred to as an exfoliate layer, occasionally) as a transfer layer is provided on one surface of a substrate (it is referred to as a protective layer transfer sheet, occasionally), and (iii) thermal transfer sheets including an appropriate combination of these structures, for example, a thermal transfer sheet in which a transfer layer of a layered structure including an exfoliate layer and a receiving layer layered in this order from the side of a substrate is provided on one surface of the substrate. The transfer layer of these thermal transfer sheets is transferred onto a transfer receiving article by superposing such a thermal transfer sheet on the transfer receiving article and heating the other side of the substrate by a heating device. The transfer layer transferred on the transfer receiving article is peeled off from the substrate of the thermal transfer sheet to thereby provide a print including the transfer layer transferred on the transfer receiving article.

Such a thermal transfer sheet is required to have satisfactory peelability when the transfer layer transferred on the transfer receiving article is peeled off from the thermal transfer sheet. In particular, with recent diversification of printers, the range of the peeling temperature at which the transfer layer is peeled off tends to extend. The transfer layer of thermal transfer sheets is required to have satisfactory peelability in both high-temperature peeling and low-temperature peeling environments, in other words, to have satisfactory peelability in a broad peeling environment without being affected by a peeling environment when the transfer layer is peeled off.

As printers that are used in different peeling environments, there are known hot peeling-type printers that apply energy to, for example, a thermal transfer sheet to melt or soften the transfer layer and cause the transfer layer transferred on a transfer receiving article to be peeled off from the thermal transfer sheet before this transfer layer solidifies, cold peeling-type printers that cause the transfer layer transferred on the transfer receiving article to be peeled off from the thermal transfer sheet after the transfer layer has solidified, and the like.

Under such circumstances, there are suggested a thermal transfer sheet including a release layer provided between a substrate and a transfer layer and having an interface between the release layer and the transfer layer as a transfer interface, and the like. The release layer referred to herein is a layer that remains on the side of the substrate when the transfer layer is transferred.

However, even in the case of a thermal transfer sheet including a release layer provided between a substrate and a transfer layer, unless peelability of the transfer layer in a broad peeling environment is satisfied without being affected by a peeling environment when the transfer layer is peeled off, irregular transfer in which the transfer layer is not peeled off at a normal peeling interface, for example, irregular transfer in which it is not possible to peel off the transfer layer at the interface between the transfer layer and the release layer is more likely to occur, in peeling off the transfer layer in a predetermined peeling environment. Moreover, unless the peelability of the transfer layer in a broad peeling environment is satisfied without being affected by a peeling environment when the transfer layer is peeled off, tailing, in which the transfer layer, which should normally remain on the substrate, is also transferred onto a transfer receiving article, is more likely to occur, in peeling off the transfer layer in a predetermined peeling environment.

CITATION LIST

Patent Literature

Patent Literature 1: Japanese Patent Laid-Open No. 9-290576
Patent Literature 2: Japanese Patent Laid-Open No. 11-263079
Patent Literature 3: Japanese Patent Laid-Open No. 2001-246845

SUMMARY OF INVENTION

Technical Problem

The present invention has been made in view of the above-mentioned circumstances, and the present invention aims principally to provide a thermal transfer sheet that is capable of satisfying the peelability of a transfer layer without being affected by a peeling environment when the transfer layer is peeled off.

Solution to Problem

The present invention for solving the above problem is a thermal transfer sheet including a substrate and a transfer layer provided on the substrate, wherein the peeling force in a stable period is in the range of 4.6 g/cm or more and 23 g/cm or less when the transfer layer is peeled off at a peeling temperature in the range of 30° C. or more and 70° C. or less and at a peeling angle of 90° while the surface of the transfer layer on the side opposite to the substrate is made to serve as a peeling interface.

Alternatively, when the transfer layer is peeled off at the peeling temperature in the range of 30° C. or more and 70° C. or less and at the peeling angle of 90° while the surface of the transfer layer on the side opposite to the substrate is made to serve as a peeling interface, the initial breakage peeling force may be 47 g/cm or less.

A release layer may be provided between the substrate and the transfer layer.

The release layer may contain a thermally cured resin and a peeling-force adjusting agent, and the content of the peeling-force adjusting agent may be 3% by mass or more and 45% by mass or less on the basis of the total mass of the release layer.

The peeling-force adjusting agent may be a hydroxyl group-containing resin having a hydroxyl value in the range of 3 mgKOH/g or more and 100 mgKOH/g or less. The peeling-force adjusting agent may be a thermoplastic resin having a glass transition temperature (Tg) of 30° C. or more and 130° C. or less. The peeling-force adjusting agent may be at least one selected from the group of thermoplastic acryl resins, thermoplastic elastomers, rosin ester resins, and polyester resins.

The thermally cured resin may be a silicone type resin.

The release layer may contain a silicone type resin and a peeling-force adjusting agent, and the peeling-force adjusting agent may be a hydroxyl group-containing resin having a hydroxyl value in the range of 3 mgKOH/g or more and 100 mgKOH/g or less.

The present invention for solving the above problem is a thermal transfer sheet including a substrate, a release layer provided on one surface of the substrate, and a transfer layer provided on the release layer, wherein the transfer layer is provided peelably from the release layer, the release layer contains a silicone type resin and a peeling-force adjusting agent, the peeling-force adjusting agent is a hydroxyl group-containing resin having a hydroxyl value in the range of 3 mgKOH/g or more and 100 mgKOH/g or less, and the content of the peeling-force adjusting agent is 3% by mass or more and 45% by mass or less on the basis of the total mass of the release layer.

The silicone type resin may be a silicone type acryl resin.

An adhesion layer is provided between the substrate and the release layer, and the adhesion force between the release layer and the adhesion layer may be made higher than the adhesion force between the release layer and the transfer layer.

The transfer layer may have a single-layer structure including only a protective layer or a layered structure including a protective layer. The transfer layer also may have a layered structure in which a protective layer and a receiving layer are layered in this order from the side of the substrate.

Advantageous Effect of Invention

According to the present invention, it is possible to satisfy the peelability of the transfer layer without being affected by a peeling environment when the transfer layer is peeled off.

BRIEF DESCRIPTION OF DRAWING

FIG. 4 is a drawing illustrating peeling force in a stable period and initial breakage peeling force.

DESCRIPTION OF EMBODIMENT

Figure 1:
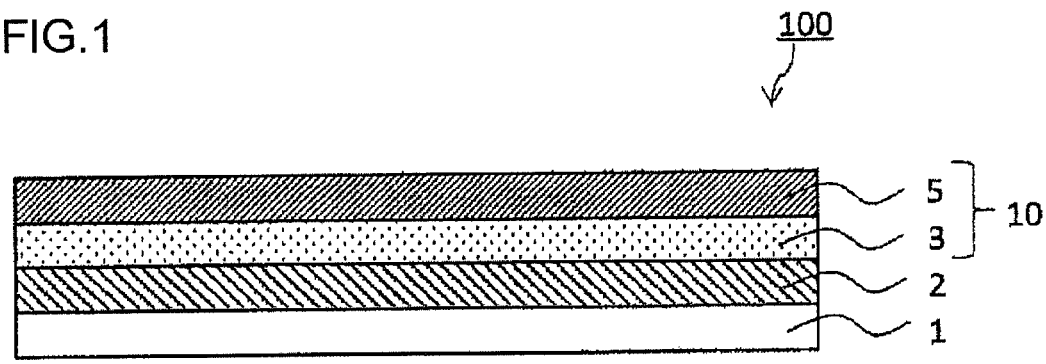
FIG. 1 is a cross-sectional schematic view showing one example of a thermal transfer sheet according to the present invention.

Hereinbelow, the thermal transfer sheet of the present invention will be described with reference to the drawings. Note that the present invention can be implemented in many different modes and should not be construed as being limited to the description of embodiments illustrated below. In the drawings, constituents may be shown schematically regarding the width, thickness, shape and the like, in comparison with the actual aspects, for the sake of clearer illustration. The schematic drawings are merely examples and do not limit the interpretations of the present invention in any way. In the specification of the present application and the drawings, constituents similar to those described before with reference to a previous drawing bear the identical reference signs thereto, and detailed descriptions thereof may be omitted.

<<Thermal Transfer Sheet>>

Figure 2:
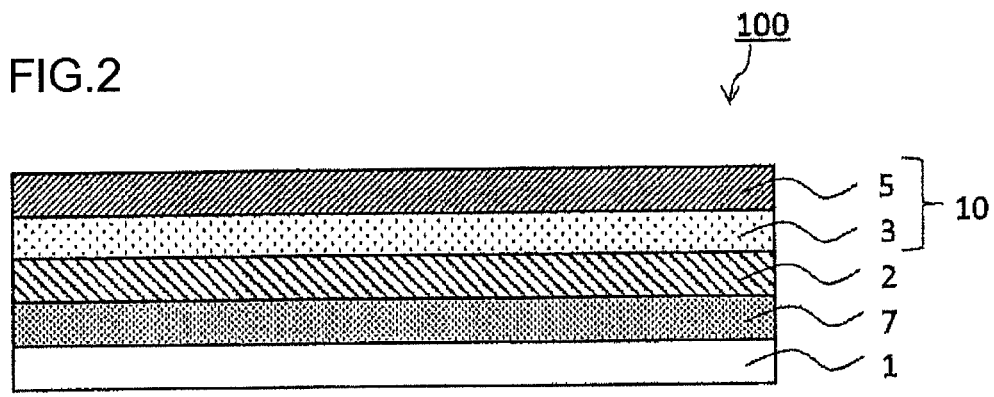
FIG. 2 is a cross-sectional schematic view showing one example of a thermal transfer sheet according to the present invention.

Hereinbelow, a thermal transfer sheet 100 of the present invention will be described with reference to the drawings. As shown in FIGS. 1 and 2, the thermal transfer sheet 100 of the present invention has a substrate 1, a release layer 2 provided on one surface of the substrate 1 (the upper surface of the substrate 1 in the form shown), and a transfer layer 10 provided on the release layer 2. The transfer layer 10 is provided peelably from the release layer 2. The transfer layer 10 may have a single layer structure including only a single layer or may have a layered structure including two or more layers. The thermal transfer sheet 100 of the form shown in FIGS. 1 and 2 has a layered structure in which the transfer layer 10, a protective layer 3, and an adhesive layer 5 are layered in this order from the side of the substrate 1 (from the side of the release layer 2).

The thermal transfer sheet 100 of the present invention is a thermal transfer sheet that is used to obtain a print to be formed by transferring the transfer layer 10 onto an optional object (hereinbelow the object is referred to as a transfer receiving article).

Hereinbelow, the thermal transfer sheet 100 of the present invention will be specifically described based on a thermal transfer sheet of First Embodiment and a thermal transfer sheet of Second embodiment.

(Thermal Transfer Sheet of First Embodiment)

The thermal transfer sheet 100 of First Embodiment of the present invention (hereinbelow, the sheet is referred to as the thermal transfer sheet of First Embodiment), as shown in FIGS. 1 and 2, has a substrate 1 and a transfer layer 10 provided on one surface of the substrate 1 (the upper surface of the substrate 1 in the form shown), and is characterized in that the peeling force in a stable period is in the range of 4.6 g/cm or more and 23 g/cm or less when the transfer layer 10 is peeled off at a peeling temperature in the range of 30° C. or more and 70° C. or less and at a peeling angle of 90° while the surface of the transfer layer 10 on the side opposite to the substrate 1 is made to serve as a peeling interface. In the form shown in FIGS. 1 and 2, a release layer 2 is provided between the substrate 1 and the transfer layer 10, but the release layer 2 is an optional constituent in the thermal transfer sheet 100 of First Embodiment.

According to the thermal transfer sheet 100 of First Embodiment having the above characteristic, it is possible to sufficiently satisfy the peelability when the transfer layer 10 is peeled off from a transfer receiving article without being affected by a peeling environment when the transfer layer 10 is peeled off, that is, in a broad peeling environment only by satisfying a requirement in that the peeling force in a stable period is 4.6 g/cm or more and 23 g/cm or less when the transfer layer 10 is peeled off at a peeling temperature in the range of 30° C. or more and 70° C. or less and at a peeling angle of 90° while the surface of the transfer layer 10 on the side opposite to the substrate 1 is made to serve as a peeling interface (hereinbelow, this requirement may be referred to as a "specific requirement"). In particular, even when high energy is applied to transfer the transfer layer 10 onto a transfer receiving article, it is possible to sufficiently satisfy the peelability of the transfer layer 10 in a broad peeling environment. Specifically, it is possible to prevent various problems caused by insufficient peelability of the transfer layer 10, for example, irregular transfer in which the release layer, which is originally supposed to remain on the side of the substrate of the thermal transfer sheet, is transferred together with the transfer layer 10 onto a transfer receiving article, or in which it is not possible to peel off the transfer layer at the interface between the transfer layer and the release layer, in the case in which an optional layer such as a release layer is provided between the substrate and the transfer layer 10. It is also possible to prevent tailing when the transfer layer is transferred onto a transfer receiving article. Tailing referred to herein means a phenomenon in which, when the transfer layer is transferred onto a transfer receiving article, the transfer layer is transferred, originating at the boundary between the region to be transferred and the region not to be transferred of the transfer layer, as if protruding from the boundary over the side of the region not to be transferred.

That the peeling force in a stable period is in the range of 4.6 g/cm or more and 23 g/cm or less when the transfer layer 10 is peeled off at a peeling temperature in the range of 30° C. or more and 70° C. or less and at a peeling angle of 90° while the surface of the transfer layer 10 on the side opposite to the substrate 1 is made to serve as a peeling interface referred to herein means that the peeling force in a stable period is 4.6 g/cm or more and 23 g/cm or less when the transfer layer 10 is peeled off in the entire temperature range of 30° C. or more and 70° C. or less at a peeling angle of 90°. Due to the nature of variation in the peeling force, provided that a peeling force in a stable period is 4.6 g/cm or more and 23 g/cm or less when the transfer layer 10 is peeled off at 30° C. and 70° C. at a peeling angle of 90°, the peeling force in a stable period is 4.6 g/cm or more and 23 g/cm or less when the transfer layer 10 is peeled off from the release layer 2 at a peeling angle of 90° in any range of 30° C. or more and 70° C. or less.

If the peeling force in a stable period when the transfer layer 10 is peeled off does not satisfy the above "specific requirement", specifically if the peeling force in a stable period is less than 4.6 g/cm when the transfer layer is peeled off at a peeling temperature in the range of 30° C. or more and 70° C. or less and at a peeling angle of 90° while the surface of the transfer layer on the side opposite to the substrate 1 is made to serve as a peeling interface, it is not possible to sufficiently prevent tailing that occurs in the transfer layer transferred on the transfer receiving article in a broad peeling environment. In other words, it is not possible to transfer the transfer layer onto a transfer receiving article in a shape intended. In contrast, if the peeling force in a stable period exceeds 23 g/cm when the transfer layer is peeled off at a peeling temperature in the range of 30° C. or more and 70° C. or less and at a peeling angle of 90° while the surface of the transfer layer on the side opposite to the substrate is made to serve as a peeling interface, it is not possible to sufficiently prevent occurrence of irregular transfer in which it is not possible to peel off the transfer layer while the surface of the transfer layer on the side opposite to the substrate is made to serve as a peeling interface in a broad peeling environment. In the case where a release layer or the like is provided between the substrate and the transfer layer, it is not possible to sufficiently prevent occurrence of irregular transfer in which, when the transfer layer is transferred onto the transfer receiving article, the whole or a portion of the release layer is transferred together with the transfer layer onto the side of the transfer receiving article, in a broad peeling environment. A "peeling environment when the transfer layer is peeled off (broad peeling environment)" referred to herein is not particularly limited. One example thereof can include a temperature environment in which the temperature when the transfer layer 10 is peeled off is 30° C. or more and 70° C. or less.

(Method for Calculating Peeling Force in a Stable Period)

Figure 3:
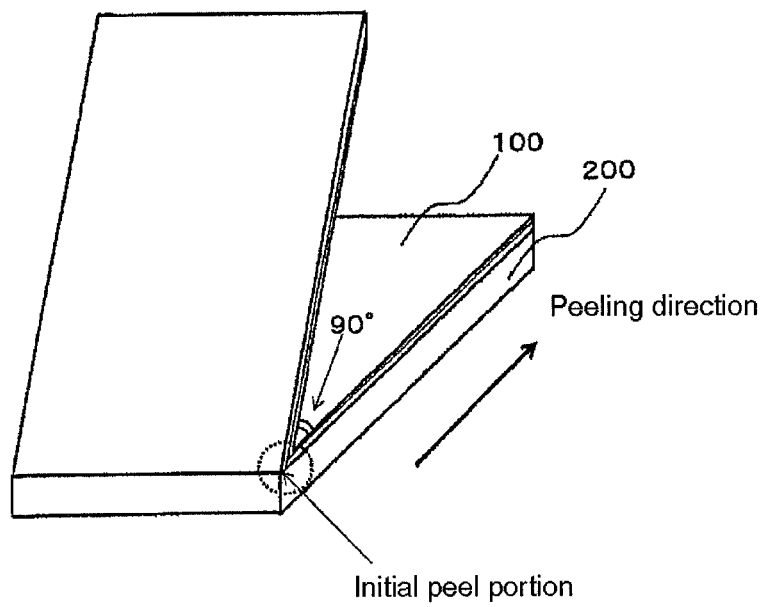
FIG. 3 is a schematic view showing one example of a method for measuring peeling force in a stable period and initial breakage peeling force.

For the peeling force in a stable period of the transfer layer 10 at a peeling temperature of 30° C., the thermal transfer sheet 100 including the substrate 1 and the transfer layer 10 provided on one surface of the substrate 1 is cut into a strip having a predetermined width (hereinbelow, this width is referred to as a width A). The width of the transfer layer 10 at this time is also a width A. Then, as shown in FIG. 3, the cut strip of the thermal transfer sheet 100 is affixed onto a hot stage 200 temperature-controlled at 30° C. using transparent double-sided tape (Nice tuck NW-15, Nichiban Co., Ltd.) such that the surface of the hot stage 200 and the surface of the transfer layer 10 are opposed to each other. Then, the transfer layer 10 of the affixed thermal transfer sheet is peeled off under conditions including a peeling angle of 90° and a peel rate of 5 mm/sec from the side of the substrate 1 of the thermal transfer sheet 100. The peeling force in the measurement range where the peeling force is stabilized is measured with a peeling force meter (Digital Force Gauge DPX-5, IMADA CO., LTD.). Then, the peeling force measured is divided by the length of the thermal transfer sheet in the width direction (width A) to calculate the peeling force in a stable period. In order to calculate the peeling force in a stable period of the transfer layer at 70° C., it is only required to control the temperature of the hot stage 200 to 70° C. The same applies to other temperatures.

The peeling force when the transfer layer 10 is peeled off from the side of the substrate 1 of the thermal transfer sheet (from the release layer 2 in the form shown in FIGS. 1 and 2) exhibits behavior shown in FIG. 4. It is conceived that various problems caused by the peeling force are considerably affected by the peeling force of the transfer layer after initial breakage, that is, the peeling force in a stable period. Accordingly, in calculating the peeling force in a stable period of the transfer layer 10, a range from the initial peel portion (see FIG. 3) to a point up to 5 mm (5 mm exclusive) distant in the peeling direction from the initial peel portion is excluded from the measurement range. In other words, a range between a point 5 mm distant in the peeling direction from the initial peel portion (see FIG. 3) and a point 15 mm distant in the peeling direction from the initial peel portion, that is, a range between a point 5 mm distant in the peeling direction from the initial peel portion (see FIG. 3) as the starting point and a point 10 mm distant in the peeling direction from this starting point (peeling length: 10 mm) is used as the measurement range. Thus, the peeling force in a stable period of the transfer layer 10 referred to herein means a value obtained by continuously measuring peeling forces in a range between a point 5 mm distant in the peeling direction from the initial peel portion (see FIG. 3) and a point 15 mm distant in the peeling direction from the initial peel portion and dividing the peeling force having the maximum value among the peeling forces measured (maximum peeling force in the measurement range) by the length of the thermal transfer sheet in the width direction (width A).

A preferred thermal transfer sheet 100 of First Embodiment has an initial breakage peeling force of 47 g/cm or less when the transfer layer 10 is peeled off at a peeling temperature in the range of 30° C. or more and 70° C. or less and at a peeling angle of 90° while the surface of the transfer layer 10 on the side opposite to the substrate 1 is made to serve as a peeling interface. Specifically, peeling forces are measured in the range from the initial peel portion (see FIG. 3) to a point 5 mm (5 mm exclusive) distant in the peeling direction from the initial peel portion, and the peeling force having the maximum value (maximum peeling force in the measurement range) among the peeling forces measured is divided by the length of the thermal transfer sheet in the width direction (width A) to provide a value of 47 g/cm or less. It is possible to calculate the initial breakage peeling force in the same manner as for the above peeling force in a stable period except the measurement ranges of the peeling forces are different. According to the preferred thermal transfer sheet 100 of First Embodiment, it is possible to make a further improvement in the peelability of the transfer layer 10 in the initial peeling, in which the transfer layer 10 is peeled off while the surface of the transfer layer 10 on the side opposite to the substrate 1 is made to serve as a peeling interface.

The thermal transfer sheet 100 of First Embodiment described hereinabove is characterized in that the above "specific requirement" is found with attention paid on the peeling force of the transfer layer and the temperature range that satisfies the peeling force in order to prevent occurrence of tailing and irregular transfer in a broad peeling environment. Accordingly, the thermal transfer sheet 100 of First Embodiment is not limited in any way with respect to other requirements than this, as long as the transfer layer 10 is provided on the substrate 1 and the transfer layer 10 satisfies the above "specific requirement". For example, a release layer 2 may be provided between the substrate 1 and the transfer layer 10, the design of the release layer 2 may be changed as appropriate, the components contained in the release layer 2 and the content thereof may be adjusted as appropriate, such that the transfer layer 10 satisfies the above "specific requirement".

Alternatively, the components contained in layers constituting the transfer layer 10 and the content thereof may be adjusted as appropriate such that the transfer layer 10 satisfies the above "specific requirement". The components contained in both the release layer 2 and the transfer layer 10 may be set as appropriate such that the transfer layer 10 satisfies the above "specific requirement". When a release layer 2 is provided between the substrate 1 and the transfer layer 10, an optional layer is further provided between the substrate 1 and the release layer 2 such that the transfer layer 10 satisfies the above "specific requirement" with the optional layer. As the thermal transfer sheet 100 of First Embodiment, the structure of the thermal transfer sheet 100 of Second Embodiment described below may be appropriately selected and used, or any structures other than this may be used.

In the thermal transfer sheet 100 of First Embodiment as an example, the release layer 2 contains a silicone type resin and a peeling-force adjusting agent. According to the thermal transfer sheet 100 of First Embodiment as an example, it is possible to easily adjust the peeling force in a stable period in the range of 4.6 g/cm or more and 23 g/cm or less when the transfer layer 10 is peeled off at a peeling temperature in the range of 30° C. or more and 70° C. or less and at a peeling angle of 90° while the surface of the transfer layer 10 on the side opposite to the substrate 1 is made to serve as a peeling interface by adjusting the content of the peeling-force adjusting agent as appropriate. The peeling-force adjusting agent will be described below in the thermal transfer sheet 100 of Second Embodiment.

In the thermal transfer sheet 100 of First Embodiment as another example, the transfer layer 10 contains a filler. According to the thermal transfer sheet 100 of First Embodiment as another example, it is possible to adjust the peeling force in a stable period in the range of 4.6 g/cm or more and 23 g/cm or less when the transfer layer 10 is peeled off from the release layer 2 at a peeling temperature in the range of 30° C. or more and 70° C. or less and at a peeling angle of 90° by adjusting the thickness of the transfer layer 10 and the volume-average particle size of a filler as appropriate and adjusting the amount of filler protruding that protrudes from the surface of the transfer layer 10 as appropriate.

In the thermal transfer sheet 100 of First Embodiment as another example, the release layer 2 contains a thermally cured resin and a peeling-force adjusting agent, and the content of the peeling-force adjusting agent is 3% by mass or more and 45% by mass or less on the basis of the total mass of the release layer 2. In this case, as the peeling-force adjusting agent, a thermoplastic resin is preferably used, and a thermoplastic resin having a glass transition temperature (Tg) of 30° C. or more and 130° C. or less is preferably used. As the thermoplastic resin, at least one selected from the group of thermoplastic acryl resins or thermoplastic elastomers, rosin ester resins, and polyester resins is preferably used. Thermally cured resins or thermosetting resins described below may be appropriately selected and used. According to the thermal transfer sheet in these forms, it is possible to adjust the peeling force in a stable period in the range of 4.6 g/cm or more and 23 g/cm or less when the transfer layer 10 is peeled off from the release layer 2 at a peeling temperature in the range of 30° C. or more and 70° C. or less and at a peeling angle of 90°.

As shown in FIG. 2, in the thermal transfer sheet 100 of First Embodiment, an adhesion layer 7 may be provided between the substrate 1 and the release layer 2, and additionally, the adhesion force between the release layer 2 and the adhesion layer 7 may be made higher than the adhesion force between the release layer 2 and the transfer layer 10.

(Thermal Transfer Sheet of Second Embodiment)

Subsequently, the thermal transfer sheet 100 of Second Embodiment of the present invention (hereinbelow, the sheet is referred to as the thermal transfer sheet of Second Embodiment) will be described. The thermal transfer sheet 100 of Second Embodiment, as shown in FIGS. 1 and 2, has a structure in which a substrate 1, a release layer 2 provided on one surface of the substrate 1 (the upper surface of the substrate 1 in the form shown), and a transfer layer 10 provided on the release layer 2, the transfer layer 10 being provided peelably from the release layer 2. The constituents each will be described hereinbelow.

(Substrate)

The substrate 1 is an essential constituent in the thermal transfer sheet 100 of Second Embodiment and has the release layer 2, and the transfer layer 10 provided on one surface of the substrate 1. There is no particular limitation with respect to the materials of the substrate 1, and it is preferred for the materials to have heat resistance sufficient to endure the thermal energy when the transfer layer 10 is transferred onto a transfer receiving article (e.g., the heat of a thermal head, heat roller, or hot stamp machine) and to have mechanical strength sufficient to support the release layer 2 and the transfer layer 10 and solvent resistance. Examples of such materials of the substrate 1 can include polyester type resins such as polyethylene terephthalate (PET), polybutylene terephthalate (PBT), polyethylene naphthalate (PEN), polyethylene terephthalate-isophthalate copolymers, terephthalic acid-cyclohexanedimethanol-ethylene glycol copolymers, and polyethylene terephthalate/polyethylene naphthalate coextruded films, polyamide type resins such as nylon 6 and nylon 66, polyolefin type resins such as polyethylene, polypropylene, and polymethylpentene, vinyl type resins such as polyvinyl chloride, acryl type resins such as polyacrylate, polymethacrylate, and polymethyl methacrylate, imide type resins such as polyimide and polyether imide, engineering resins such as polyarylate, polysulfone, polyether sulfone, polyphenylene ether, polyphenylene sulfide (PPS), polyaramid, polyether ketone, polyether nitrile, polyether ether ketone, and polyether sulfite, polycarbonate, styrene type resins such as polystyrene, high impact polystyrene, acrylonitrile-styrene copolymers (AS resins), and acrylonitrile-butadiene-styrene copolymers (ABS resins), and cellulose type films such as cellophane, cellulose acetate, and nitrocellulose.

The substrate 1 may be a copolymer resin mainly based on a resin exemplified above or a mixed product (including an alloy), or a laminate composed of a plurality of layers. The substrate also may be a stretched film or an unstretched film. For the purpose of improving the strength, films stretched in a uniaxial direction or biaxial direction are preferably used. The substrate 1 may be used in the form of a film, sheet or board composed of at least one layer of these resins. Among the substrates composed of the resins exemplified above, polyester type films such as polyethylene terephthalate and polyethylene naphthalate are suitably used due to their excellent thermal resistance and mechanical strength. Among these, polyethylene terephthalate films are more preferable.

For preventing blocking, it is possible to impart asperities to the surface of the substrate 1 as required. Examples of procedures to form asperities on the surface of the substrate 1 include matting agent-kneading processing, sand blast processing, hairline processing, matte coating processing, and chemical etching processing. The matting agent-kneading processing is a processing method for forming a substrate from a resin into which an inorganic material or an organic material is kneaded. The matte coating processing is a processing method for imparting asperities to a substrate surface by coating the substrate surface with a coating agent containing an organic material or an inorganic material.

There is no particular limitation with respect to the thickness of the substrate 1, and the thickness is preferably in the range of 0.5 µm or more and 50 µm or less, more preferably in the range of 4 µm or more and 25 µm or less. By setting the thickness of the substrate 1 within this range, it is possible to sufficiently transmit the energy applied to the side of the substrate 1 when the transfer layer 10 is transferred onto a transfer receiving article to the side of the transfer layer 10 and to make a further improvement in the transferability when the transfer layer 10 is transferred. It is also possible to increase the mechanical strength of the substrate 1 and to sufficiently support the transfer layer 10.

The surface of the side in contact with the release layer 2 of the substrate 1 may be subjected to easily-adhesive treatment, in advance, such as corona discharge treatment, plasma treatment, ozone treatment, flame treatment, primer (also referred to as an anchor coat, an adhesion promoter, or an easy-adhesion agent) coating treatment, preheating treatment, dust removing treatment, vapor deposition treatment, alkaline treatment, and addition of an antistatic layer. Additives such as a filling agent, a plasticizer, a colorant, and an antistatic agent may be also added to the substrate 1 as required.

(Transfer Layer)

As shown in FIG. 1, the transfer layer 10 is provided on the release layer 2. The transfer layer 10 is a layer that is peeled off while the surface of the transfer layer 10 on the side opposite to the substrate 1 is made to serve as a peeling interface and transferred onto a transfer receiving article in thermal transferring. Specifically, in the thermal transfer sheet 100 of Second Embodiment, the transfer layer 10 is provided on the release layer 2, and the transfer layer 10 is a layer that is peeled off from the release layer 2 and transferred onto a transfer receiving article in thermally transferring. The transfer layer 10 as an example has a layered structure in which a protective layer 3 and an adhesive layer 5 are layered in this order from the side of the substrate 1. The transfer layer 10 may have a single layer structure constituted by one layer or may have a layered structure constituted by two or more layers. Hereinbelow, a case in which the transfer layer 10 is a transfer layer in which a protective layer 3 and an adhesive layer 5 are layered in this order from the side of the substrate 1 will be principally described.

(Protective Layer)

The protective layer 3 included in the transfer layer 10 as an example is a layer for imparting durability to a print obtained by transferring the transfer layer 10 onto a transfer receiving article. Incidentally, the protective layer 3 is located nearest of the layers constituting the transfer layer 10 from the substrate 1 and is located on the outermost surface in a print obtained by transferring the transfer layer 10 onto the transfer receiving article. In other words, the thermal transfer sheet of Second Embodiment as an example takes a form in which the transfer layer 10 is peeled off at the interface between the release layer 2 and the protective layer 3.

There is no particular limitation with respect to the protective layer 3, and protective layers conventionally known in the field of thermal transfer sheets or protective layer transfer sheets may be appropriately selected and used. Examples of the resin constituting the protective layer 3 can include polyester resins, polystyrene resins, acryl resins, polyurethane resins, acrylic urethane resins, silicone-modified forms of these resins, and mixtures of these resins.

The protective layer 3 in a preferred form for imparting durability to a print contains an active ray-cured resin which is a reaction product of an active ray-curable resin and an active ray, in other words, an active ray-cured resin obtained by irradiating an active ray-curable resin with an active ray (hereinbelow, an active ray-cured resin obtained by irradiating an active ray-curable resin with an active ray is referred to as an active ray-cured resin). Incidentally, the active ray-curable resin referred to in the specification of the present application means a precursor or a composition before irradiated with an active ray. The active ray referred to in the specification of the present application means a radioactive ray which is allowed to chemically act on an active ray-curable resin to promote polymerization. Specific examples include visible light rays, ultraviolet rays, X rays, electron beams, α rays, ρ rays, and γ rays. A protective layer in a preferred form will be described.

According to the protective layer 3 containing an active ray-cured resin, it is possible to impart very high durability to a print obtained by transferring the transfer layer 10 onto a transfer receiving article. Incidentally, besides physical durability such as abrasion resistance, chemical durability such as solvent resistance and plasticizer resistance is included in the durability referred to herein. In other words, according to the thermal transfer sheet 100 of Second Embodiment, it is possible to obtain a print excellent both in physical durability and chemical durability by transferring the transfer layer 10 onto a transfer receiving article.

Subsequently, the active ray-curable resin will be described. The active ray-curable resin as an example comprises, as polymerization components, a composition and the like prepared by appropriately mixing a polymer, a prepolymer, an oligomer and/or a monomer having a polymerizable unsaturated bond such as a (meth)acryloyl group and a (meth)acryloyloxy group or an epoxy group in the molecule.

The active ray-curable resin as an example also comprises a urethane(meth)acrylate as a polymerization component. As the urethane(meth)acrylate, a polyfunctional urethane(meth) acrylate is preferably comprised. As the polyfunctional urethane(meth)acrylate, a urethane(meth)acrylate having 5 or more and 15 or less functional groups is preferable, and a urethane(meth)acrylate having 6 or more and 15 or less functional groups is more preferable. By forming the protective layer 3 using an active ray-curable resin in which the urethane(meth)acrylate has functional groups within the above numerical range, it is possible to make a further improvement in the physical durability and the chemical durability. Incidentally, in the specification of the present application, a urethane(meth)acrylate having 5 or more functional groups is referred to as a polyfunctional urethane (meth)acrylate.

The protective layer 3 contains a polyfunctional urethane (meth)acrylate preferably in the range of 5% by mass or more and 80% by mass or less, more preferably in the range of 10% by mass or more and 50% by mass or less on the basis of the total mass of the protective layer 3.

From the viewpoint of combining the solvent resistance and the bendability of the protective layer, the protective layer 3 preferably contains either one or both of a urethane (meth)acrylate having about 2 or more and 4 or less functional groups and a (meth)acrylate having about 2 or more and 5 or less functional groups, together with the above polyfunctional urethane(meth)acrylate. The protective layer 3 contains a urethane(meth)acrylate and a (meth)acrylate each having about 2 or more and 4 or less functional groups preferably in the range of 5% by mass or more and 80% by mass or less, more preferably in the range of 10% by mass or more and 70% by mass or less on the basis of the total mass of the protective layer 3.

Additionally, the mass average molecular weight of both of the polyfunctional urethane(meth)acrylate and the urethane(meth)acrylate having about 2 or more and 4 or less functional groups is preferably in the range of 400 or more and 20000 or less, more preferably in the range of 500 or more and 10000 or less. When the mass average molecular weight of the urethane(meth)acrylate is set within the above numerical range, it is possible to further improve the abrasion resistance and foil cutting property. For a similar reason, the mass average molecular weight of the (meth) acrylate having about 2 or more and 4 or less functional groups is preferably in the range of 200 or more and 5000 or less. Incidentally, the "mass average molecular weight" in the specification of the present application means a value measured by gel permeation chromatography using polystyrene as a standard substance and can be measured by a methods in compliance with JIS-K-7252-1 (2008).

The protective layer 3 may also comprise an unsaturated bond-containing (meth)acryl type copolymer (hereinbelow, the copolymer may be referred to as an unsaturated-bond containing acrylic copolymer) as a polymerization component. Examples of the unsaturated bond-containing (meth) acryl type copolymer include polyester(meth)acrylate, epoxy(meth)acrylate, melamine(meth)acrylate, and triazine (meth)acrylate.

The acid value of the unsaturated bond-containing acrylic copolymer is preferably within the range of 5 mgKOH/g or more and 500 mgKOH/g or less, more preferably within the range of 10 mgKOH/g or more and 150 mgKOH/g or less. By using an unsaturated bond-containing acryl copolymer having an acid value in the above range, a transfer layer 10 having high surface strength can be obtained. Incidentally, the "acid value" referred in the specification of the present application means the amount of potassium hydroxide in milligrams that is required to neutralize free fatty acid contained in 1 g of a polymer and can be measured by a method in compliance with JIS-K-2501. The acid value of a polymer can be adjusted as appropriate by adjusting the ratio of monomer components constituting the polymer.

The mass average molecular weight of the unsaturated bond-containing acrylic copolymer is preferably in the range of 3000 or more and 100000 or less, more preferably in the range of 10000 or more and 80000 or less. By setting the mass average molecular weight within this range, it is possible to make a further improvement in the chemical durability such as thermal resistance and chemical resistance and the physical durability such as scratch resistance. Additionally, by setting the mass average molecular weight within this range, it is possible to prevent gelling reaction during preservation of a coating liquid for a protective layer for forming a protective layer and to improve the preservation stability of the coating liquid for a protective layer.

The unsaturated bond-containing acrylic copolymer described above is contained in an active ray-curable resin preferably in the range of 10% by mass or more and 80% by mass or less, more preferably in the range of 20% by mass or more and 70% by mass or less, still more preferably in the range of 20% by mass or more and 50% by mass or less.

The active ray-curable resin may also comprise, as a polymerization component, in addition to the unsaturated bond-containing acrylic copolymer, an oligomer and/or monomer of (meth)acrylic acid, styrene, vinyl acetate, hydroxyethyl vinyl ether, ethylene glycol divinyl ether, pentaerythritol trivinyl ether, (meth)acrylamide, N-hydroxymethyl(meth)acrylamide, N-vinylformamide, acrylonitrile or the like. The active ray-curable resin may also comprise a prepolymer, oligomer and/or monomer as follows.

Examples of the prepolymer include polyester(meth)acrylates obtained by introducing (meth)acrylic acid into a polyester obtained by bonding a polybasic acid such as adipic acid, trimellitic acid, maleic acid, phthalic acid, terephthalic acid, himic acid, malonic acid, succinic acid, glutaric acid, itaconic acid, pyromellitic acid, fumaric acid, glutaric acid, pimelic acid, sebacic acid, dodecanoic acid, and tetrahydrophthalic acid with a polyhydric alcohol such as ethylene glycol, propylene glycol, diethylene glycol, propylene oxide, 1,4-butanediol, triethylene glycol, tetraethylene glycol, polyethylene glycol, glycerin, trimethylolpropane, pentaerythritol, sorbitol, 1,6-hexanediol, and 1,2,6-hexanetriol; epoxy(meth)acrylates obtained by introducing (meth)acrylic acid into an epoxy resin such as bisphenol A-epichlorohydrin-(meth)acrylic acid, phenol novolac-epichlorohydrin-(meth)acrylic acid; urethane(meth)acrylates obtained by introducing (meth)acrylic acid into a urethane resin such as ethylene glycol-adipic acid-tolylene diisocyanate-2-hydroxyethyl acrylate, polyethylene glycol-tolylene diisocyanate-2-hydroxyethyl acrylate, hydroxyethyl phthalyl methacrylate-xylene diisocyanate, 1,2-polybutadiene glycol-tolylene diisocyanate-2-hydroxyethyl acrylate, trimethylolpropane-propylene glycol-tolylene diisocyanate-2-hydroxyethyl acrylate; silicone resin acrylates such as polysiloxane(meth)acrylate and polysiloxane-diisocyanate-2-hydroxyethyl (meth)acrylate, and additionally, alkyd-modified (meth)acrylates obtained by introducing a (meth)acryloyl group into an oil-modified alkyd resin, and spiran resin acrylates.

Examples of the monomer or oligomer include monofunctional acrylic acid esters such as 2-ethylhexyl acrylate, 2-hydroxypropyl acrylate, glycerol acrylate, tetrahydrofurfuryl acrylate, phenoxyethyl acrylate, nonylphenoxyethyl acrylate, tetrahydrofurfuryloxyethyl acrylate, tetrahydrofurfuryloxyhexanolide acrylate, acrylates of ε-caprolactone adducts of 1,3-dioxane alcohol, and 1,3-dioxolane acrylate; or methacrylic acid, itaconic acid, crotonic acid, or maleic acid esters obtained by replacing their acrylate by methacrylate, itaconate, crotonate, or maleate; bifunctional acrylic acid esters such as ethylene glycol diacrylate, triethylene glycol diacrylate, pentaerythritol diacrylate, hydroquinone diacrylate, resorcin diacrylate, hexanediol diacrylate, neopentyl glycol diacrylate, tripropylene glycol diacrylate, diacrylate of neopentyl hydroxypivalate glycol, diacrylate of neopentyl glycol adipate, diacrylates of ε-caprolactone adducts of neopentyl hydroxypivalate glycol, 2-(2-hydroxy-1,1-dimethylethyl)-5-hydroxymethyl-5-ethyl-1,3-dioxane diacrylate, tricyclodecanedimethylol acrylate, ε-caprolactone adducts of tricyclodecanedimethylol acrylate, and diacrylate of diglycidyl ether of 1,6-hexanediol; or methacrylic acid, itaconic acid, crotonic acid, or maleic acid esters obtained by replacing their acrylate by methacrylate, itaconate, crotonate, or maleate; polyfunctional acrylic acid esters such as trimethylolpropane triacrylate, ditrimethylolpropane tetraacrylate, trimethyloletrane triacrylate, pentaerythritol triacrylate, pentaerythritol tetraacrylate, dipentaerythritol tetraacrylate, dipentaerythritol pentaacrylate, dipentaerythritol hexaacrylate, ε-caprolactone adducts of dipentaerythritol hexaacrylate, pyrogallol triacrylate, propionic acid-dipentaerythritol triacrylate, propionic acid-dipentaerythritol tetraacrylate, and hydroxypivalyl aldehyde-modified dimethylolpropane triacrylate; or methacrylic acid, itaconic acid, crotonic acid, or maleic acid esters obtained by replacing their acrylate by methacrylate, itaconate, crotonate, or maleate; phosphazene monomers, triethylene glycol, EO-modified isocyanurate diacrylate, EO-modified isocyanurate triacrylate, dimethyloltricyclodecane diacrylate, trimethylolpropane acrylic acid benzoic acid esters, and alkylene glycol type acrylic acid-modified and urethane-modified acrylates.

There is no particular limitation with respect to the content of the active ray-cured resin on the basis of the total mass of the protective layer 3, and in the case in which higher durability is required, the content of the active ray-cured resin is preferably 30% by mass or more, more preferably 50% by mass or more on the basis of the total mass of the protective layer 3. The upper limit is not particularly limited and can be set as appropriate depending on components to be added optionally and the like. An example is 100% by mass.

The protective layer 3 may contain one active ray-cured resin solely or may contain two or more active ray-cured resins. The protective layer 3 may also contain other resin together with the active ray-cured resin. Other resin may be one cured with a curing agent or the like or uncured one.

The protective layer 3 may contain other components in addition to the active ray-cured resin. Examples of the other components include a filler. By allowing the protective layer 3 to contain a filler, it is possible to improve the foil cutting property of the transfer layer 10.

Examples of the filler can include organic fillers, inorganic fillers, and fillers of organic-inorganic hybrid type. The filler may also be in a powder or a sol form, but powder fillers are preferably used because of their wide solvent-selectivity when a coating liquid for a protective layer is prepared.

The filler contained in the protective layer 3 is preferably a filler having a volume-average particle size of 1 nm or more and 1 μm or less, more preferably a filler having a volume-average particle size of 1 nm or more and 50 nm or less, still more preferably a filler having a volume-average particle size of 7 nm or more and 25 nm or less. By allowing the protective layer 3 to contain a filler having a volume-average particle size within the range described above, it is possible to make a further improvement in the transferability.

Incidentally, the "volume-average particle size" means a particle size measured in compliance with JIS-Z-8819-2 (2001) and is a value determined using a grain size distribution/particle size distribution analyzer (Nanotrac grain size distribution analyzer, NIKKISO CO., LTD.).

Examples of the powder organic filler can include acryl type particles such as uncrosslinked acryl type particles and crosslinked acryl type particles, polyamide type particles, fluorine type particles, polyethylene wax, and silicone particles. Examples of the powder inorganic filler can include calcium carbonate particles, silica particles, and metal oxide particles such as titanium oxide. Examples of the filler of organic-inorganic hybrid type include ones prepared by hybridizing an acryl resin with silica particles. Additionally, examples of the filler in the sol form can include silica sol types and organosol types. One of these fillers may be used solely or two or more of these may be mixed and used. Of these, silica particles are suitable.

The filler described above is contained preferably in the range of 10% by mass or more and 60% by mass or less, more preferably in the range of 10% by mass or more and 50% by mass or less, still more preferably in the range of 20% by mass or more and 40% by mass or less on the basis of the total mass of the protective layer 3.

There is no particular limitation with respect to the thickness of the protective layer 3, and the thickness is preferably 1 μm or more and 15 μm or less, more preferably 2 μm or more and 6 μm or less. By setting the thickness of the protective layer 3 within this range, it is possible to make a further improvement in the foil cutting property, and it is also possible to improve the effect of preventing occurrence of tailing by a synergistic effect with the release layer 2 described below. Additionally, it is possible to make a further improvement in the physical durability and the chemical durability imparted to a print obtained by transferring the transfer layer 10 onto a transfer receiving article. Furthermore, it is also possible to prevent defective transfer such as paper peeling and chipping from occurring when the transfer layer 10 is transferred.

There is no particular limitation with respect to the method for forming the protective layer 3, and the protective layer 3 can be formed by adjusting a coating liquid for a protective layer containing an active-ray curable resin and optional components, coating the release layer 2 with this coating liquid, drying the liquid to form a coated film of the protective layer, and irradiating this coated film with an active ray to crosslink and cure the polymerization components described above such as polymerizable copolymers. When ultraviolet irradiation is applied as active ray irradiation, conventionally known ultraviolet irradiation apparatus can be used. For example, various apparatuses such as high pressure mercury lamps, low pressure mercury lamps, carbon arcs, xenon arcs, metal halide lamps, non-electrode ultraviolet lamps, and LEDs can be used without limitation. Alternatively, when an electron beam is applied as active ray irradiation, a high energy-type electron beam irradiation apparatus that applies an electronic beam at an energy of 100 keV or more and 300 keV or less, a low energy-type electron beam irradiation apparatus that applies an electronic beam at an energy of 100 keV or less, or the like may be used. In terms of the irradiation mode, either of a scanning-type irradiation apparatus or a curtain-type irradiation apparatus may be used. There is no particular limitation with respect to the coating method for the coating liquid for a protective layer, conventionally known coating methods may be appropriately selected and used. Examples of the coating method include a gravure printing method, a screen printing method, and a reverse roll coating method using a gravure printing plate. Coating methods other than these also may be used. The same applies to coating methods for various coating liquids described below.

(Adhesive Layer)

In the thermal transfer sheet 100 of Second Embodiment as an example, as shown in FIG. 1, an adhesive layer 5 is provided on the protective layer 3. The adhesive layer 5 is a layer constituting the transfer layer 10 and being used for allowing the transfer layer 10 to adhere onto a transfer receiving article when the transfer layer 10 is transferred onto the transfer receiving article. Accordingly, in the thermal transfer sheet 100 of Second Embodiment, the adhesive layer 5 is a layer located on the outermost surface of the thermal transfer sheet 100. The thermal transfer sheet 100 in this form is suitable when the transfer receiving article has no adhesion to the transfer layer 10.

The adhesive layer 5 may have a function as a receiving layer capable of receiving the dye of a dye layer, in addition to the function capable of adhering to a transfer receiving article. In other words, the adhesive layer 5 may be a layer functioned both as a receiving layer and an adhesive layer 5, which has functions of both an adhesive layer and a receiving layer. Alternatively, a receiving layer may be provided between the protective layer 3 and the adhesive layer 5. When the adhesive layer 5 is formed as a layer functioned both as a receiving layer and an adhesive layer 5, by means of a thermal transfer sheet including a dye layer, it is possible to form a thermally transferable image on the layer functioned both as a receiving layer and an adhesive layer 5 located on the outermost surface of the thermal transfer sheet 100 of Second Embodiment. It is possible to transfer the transfer layer 10 including the layer functioned both as a receiving layer and an adhesive layer 5 on which the thermally transferable image has been formed onto a transfer receiving article with good adhesion.

There is no particular limitation with respect to materials of the adhesive layer 5, and materials having an adhesive property can be appropriately selected and used. Examples of the material having an adhesive property can include ionomer resins, acid-modified polyolefin type resins, ethylene-(meth)acrylic acid copolymers, ethylene-(meth)acrylic acid ester copolymers, polyester type resins, polyamide type resins, vinyl type resins, (meth)acryl type resins such as acryl type and methacryl type, acrylic acid ester type resins, maleic acid resins, butyral type resins, alkyd resins, polyethylene oxide resins, phenol type resins, urea resins, melamine resins, melamine-alkyd resins, cellulose type resins, polyurethane type resins, polyvinyl ether resins, silicone resins, and rubber type resins. The adhesive layer 5 may contain one material solely or may contain two or more materials. Among the materials exemplified above, vinyl type resins, acryl type resins, butyral type resins, and polyester type resins having a high adhesive property are preferred. Vinyl type resins, acryl type resins, ethylene-(meth) ethyl acrylate copolymers, and acrylic acid ester copolymers are more preferable. Examples of materials for the layer functioned both as a receiving layer and an adhesive layer 5 include conventionally known resin materials that easily receive thermally-transferable colorants such as subliming dyes and thermally-fusible inks, such as polyolefin type resins such as polypropylene, halogenated resins such as polyvinyl chloride and polyvinylidene chloride, vinyl type resins such as polyvinyl acetate, vinyl chloride-vinyl acetate copolymers, ethylene-vinyl acetate copolymers, and polyacrylic acid esters, polyester resins such as polyethylene terephthalate and polybutylene terephthalate, polystyrene type resins, polyamide type resins, copolymers of an olefin such as ethylene and propylene and other vinyl polymer, cellulose type resins such as ionomers and cellulose diastase, and polycarbonate. Among these, vinyl chloride-vinyl acetate type copolymers or polyvinyl chloride resins are preferable, and vinyl chloride-vinyl acetate type copolymers are particularly preferable.

There is no particular limitation with respect to the thickness of the adhesive layer 5, and the thickness is preferably in the range of 0.1 μm or more and 10 μm or less, more preferably in the range of 0.3 μm or more and 3 μm or less.

The adhesive layer 5 can be formed by dissolving or dispersing a single material or a plurality of materials selected from the above-mentioned materials and various additives to be added as required into an appropriate solvent such as water or an organic solvent to prepare a coating liquid for an adhesive layer, coating the protective layer 3 with this liquid, and drying the applied liquid.

A form in which a receiving layer, instead of the adhesive layer 5, is provided on the protective layer 3 may be acceptable (not shown). Examples of materials for the receiving layer can include polyolefin type resins such as polypropylene, halogenated resins such as polyvinyl chloride and polyvinylidene chloride, vinyl type resins such as polyvinyl acetate, vinyl chloride-vinyl acetate copolymers, ethylene-vinyl acetate copolymers, and polyacrylic esters, polyester resins such as polyethylene terephthalate and polybutylene terephthalate, polystyrene type resins, polyamide type resins, copolymers of an olefin such as ethylene or propylene and another vinyl polymer, ionomer or cellulose-based resins such as cellulose diacetate, polycarbonate, and solvent-based resins such as acryl type resins. Among these, vinyl chloride-vinyl acetate type copolymers or polyvinyl chloride resins are preferable, and vinyl chloride-vinyl acetate type copolymers are particularly preferable. The thickness of the receiving layer is preferably in the range of 0.5 μm or more and 10 μm or less, more preferably in the range of 1 μm or more and 3 μm or less.

Alternatively, the transfer layer 10 may have a single layer structure including only a single layer. For example, when a measure to improve the adhesion with the transfer layer 10 has been taken on the side of the transfer receiving article, the transfer layer 10 may have a single layer structure including only the protective layer 3. Alternatively, the transfer layer 10 may have a layered structure formed by the protective layer 3 and a receiving layer. The transfer layer 10 may have any structure other than this.

In the preferred thermal transfer sheet 100 of Second Embodiment, the transfer layer 10 has a layered structure in which the protective layer 3 in the preferred form described above and the adhesive layer 5 are layered in this order in order to provide a print on which the transfer layer 10 is transferred with high durability. The adhesive layer may have dye receptivity. Alternatively, the transfer layer 10 may have a layered structure in which the protective layer 3 in the preferred form described above and a receiving layer are layered in this order, the receiving layer having been provided with an adhesive property.

(Release Layer)

In the thermal transfer sheet 100 of Second Embodiment, as shown in FIGS. 1 and 2, a release layer 2 is provided between the substrate 1 and the transfer layer 10. The release layer 2 is a layer not constituting the transfer layer 10 described below and is a layer that remains on the side of the substrate 1 when the transfer layer 10 is transferred onto a transfer receiving article.

(Release Layer of First Aspect)

The thermal transfer sheet 100 of Second Embodiment herein is characterized in that the release layer 2 contains a silicone type resin and a peeling adjusting agent, the peeling adjusting agent is a hydroxyl group-containing resin having a hydroxyl value in the range of 3 mgKOH/g or more and 100 mgKOH/g or less, and the content of the peeling adjusting agent is in the range of 3% by mass or more and 45% by mass or less on the basis of the total mass of the release layer 2. Hereinbelow, in describing the release layer of a first aspect, a hydroxyl group-containing resin having a hydroxyl value in the range of 3 mgKOH/g or more and 100 mgKOH/g or less is referred to as a "peeling-force adjusting agent". A release layer 2 containing a silicone type resin and a peeling-force adjusting agent may be optionally referred to as a release layer of the first aspect.

According to the thermal transfer sheet 100 of Second Embodiment including the release layer of the first aspect, it is possible to satisfy the peelability when transfer layer is peeled off from a transfer receiving article in a broad peeling environment. In particular, even when high energy is applied to transfer the transfer layer onto a transfer receiving article, it is possible to satisfy the peelability of the transfer layer in a broad peeling environment without being affected by a peeling environment when the transfer layer is peeled off. More specifically, according to the thermal transfer sheet 100 of Second Embodiment, it is possible to make the peelability of the transfer layer 10 satisfactory in a broad peeling environment and to prevent various problems that may occur when the transfer layer 10 has low peelability by the interaction between the silicone type resin and the peeling-force adjusting agent. Examples of the various problems that may occur when the transfer layer has low peelability can include occurrence of irregular transfer, tailing and the like described above.

In the thermal transfer sheet 100 of Second Embodiment, the content of the peeling-force adjusting agent contained in the release layer of the first aspect is specified to be in the range of 3% by mass or more and 45% by mass or less on the basis of the total mass of the release layer of the first aspect. This is because, when the content of the peeling-force adjusting agent falls below 3% by mass, the adhesion between the release layer of the first aspect and the transfer layer 10, in other words, the adhesion between the release layer of the first aspect and the transfer layer 10 becomes excessively low and thus it is not possible to sufficiently prevent tailing that may occur when the transfer layer 10 is transferred onto a transfer receiving article in a broad peeling environment. Meanwhile, this is because, when the content of the peeling-force adjusting agent exceeds 45% by mass, the adhesion between the release layer of the first aspect and the transfer layer 10 becomes excessively high and thus, when the transfer layer 10 is transferred onto a transfer receiving article, it is not possible to sufficiently prevent occurrence of defective transfer in which a portion or the whole of the transfer layer 10 remains on the side of the substrate 1 without being transferred onto the transfer receiving article and of defective transfer in which a portion or the whole of the release layer of the first aspect, which is originally supposed to remain on the side of the substrate 1 of the thermal transfer sheet, is transferred onto the side of the transfer receiving article, in a broad peeling environment.

In the case in which the release layer of the first aspect contains a hydroxyl group-containing resin having a hydroxyl value of less than 3 mgKOH/g, instead of a hydroxyl group-containing resin having a hydroxyl value in the range of 3 mgKOH/g or more and 100 mgKOH/g or less, even if the content of the hydroxyl group-containing resin is set within the range of 3% by mass or more and 45% by mass or less on the basis of the total mass of the release layer of the first aspect and the release layer of the first aspect is caused to contain a silicone type resin, it is not possible to sufficiently prevent occurrence of tailing in a broad peeling environment. Alternatively, in the case in which the release layer of the first aspect contains a hydroxyl group-containing resin having a hydroxyl value of more than 100 mgKOH/g instead of a hydroxyl group-containing resin having a hydroxyl value in the range of 3 mgKOH/g or more and 100 mgKOH/g or less, even if the content of the hydroxyl group-containing resin is set within the range of 3% by mass or more and 45% by mass or less on the basis of the total mass of the release layer of the first aspect and the release layer of the first aspect is caused to contain a silicone type resin, it is not possible to sufficiently prevent irregular transfer that may occur when the transfer layer is transferred in a broad peeling environment.

<Peeling-Force Adjusting Agent>

There is no particular limitation with respect to the hydroxyl group-containing resin having a hydroxyl value in the range of 3 mgKOH/g or more and 100 mgKOH/g or less as the peeling-force adjusting agent, and any hydroxyl group-containing resins that satisfy a condition of a hydroxyl value in the range of 3 mgKOH/g or more and 100 mgKOH/g or less may be appropriately selected and used. Examples of the hydroxyl group-containing resin can include acryl type resins containing a hydroxyl group, rosin type resins containing a hydroxyl group, polyester resins, polyvinyl butyral resins, polyvinyl acetal resins, polyvinyl alcohol resins, polyester polyol resins, polyether polyol resins, and urethane polyol resins containing a hydroxyl group.

The hydroxyl value referred to herein means a value measured by the hydroxyl value method in compliance with JIS-K-0070 (1992).

The release layer of the first aspect in a preferred form contains a peeling-force adjusting agent having a glass transition temperature (Tg) of 30° C. or more and 130° C. or less. In other words, the release layer of the first aspect in a preferred form contains a hydroxyl group-containing resin having a hydroxyl value in the range of 3 mgKOH/g or more and 100 mgKOH/g or less and a glass transition temperature (Tg) of 30° C. or more and 130° C. or less. By forming the release layer of the first aspect that contains a peeling-force adjusting agent having a glass transition temperature (Tg) of 30° C. or more and 130° C. or less, it is possible to sufficiently prevent whitening and the like that may occur on a peeling interface when the transfer layer 10 is transferred to thereby improve the quality of the transfer surface. The glass-transition temperature (Tg) referred to herein means a temperature determined in compliance with JIS-K-7121 (2012) and based on measurement of a change in calorie (DSC method) in accordance with the DSC (differential scanning calorimetry).

<Silicone Type Resin>

A silicone type resin referred to herein means a compound having a siloxane bond in the molecular structure, and the concept thereof includes any of unmodified silicone resins, modified silicone resins, and silicone-modified resins. A silicone-modified resin can be prepared by copolymerization of a polysiloxane group-containing vinyl monomer with a vinyl monomer of another type, reaction of a thermoplastic resin with a reactive silicone resin, or the like.

Examples of the silicone-modified resin can include silicone-modified resins prepared by a method of block copolymerizing a thermoplastic resin with a polysiloxane group-containing vinyl monomer, by a method of graft copolymerizing a thermoplastic resin with a polysiloxane group-containing vinyl monomer, and by a method of reacting a thermoplastic resin with a reactive silicone resin. Examples of thermoplastic resin constituting the silicone-modified resin can include acryl resins, polyurethane resins, polyester resins, epoxy resins, polyacetal resins, polycarbonate resins, and polyimide resins, and among these, silicone type acryl resins can be suitably used.

The reactive silicone resin is a compound that has a polysiloxane structure in a main chain and also has reactive functional group(s) capable of reacting with a functional group of the thermoplastic resin at one end or both ends of the group(s). Examples of the reactive functional group described above can include an amino group, a hydroxyl group, an epoxy group, a vinyl group, and a carboxyl group.

The release layer of the first aspect may contain one silicone type resin solely or may contain two or more silicone type resins.

There is no particular limitation with respect to the content of the silicone type resin, and the content of the silicone type resin is preferably in the range of 30% by mass or more and 97% by mass or less, preferably in the range of 40% by mass or more and 97% by mass or less, particularly preferably in the range of 55% by mass or more and 97% by mass or less, on the basis of the total mass of the release layer of the first aspect. According to the release layer of the first aspect containing a silicon resin in a preferred range, it is possible to reduce variation in the peeling force and to further improve the peelability of the transfer layer 10, in a broad peeling environment, by a synergistic effect with a peeling-force adjusting agent described below.

The release layer of the first aspect may contain optional components together with the silicone type resin and the peeling-force adjusting agent described above. Examples of the optional components can include waxes and silicone oils. The release layer of the first aspect also may contain a resin that does not satisfy the requirement of the peeling-force adjusting agent described above without departing from the scope of the present invention. The release layer of the first aspect also may contain a metal catalyst such as an aluminum catalyst. The same applies to a release layer of a second aspect.

There is no particular limitation with respect to the thickness of the release layer of the first aspect, and the thickness is preferably in the range of 0.1 μm or more and 5 μm or less, more preferably in the range of 0.3 μm or more and 2 μm or less.

There is no particular limitation with respect to the method for forming the release layer of the first aspect, and the release layer can be formed by dispersing or dissolving a silicone type resin, the peeling-force adjusting agent described above, additive materials to be added as required in an appropriate solvent to adjust a coating liquid for a release layer, coating the substrate 1 or a layer to be optionally provided between the substrate 1 and the release layer of the first aspect (e.g., an adhesion layer 7 described below) with this coating liquid, and baking the layer at a temperature of 100° C. or more and 200° C. or less.

(Release Layer of Second Aspect)

The release layer of the second aspect contains a thermally cured resin and a thermoplastic resin, and the content of the thermoplastic resin is in the range of 3% by mass or more and 45% by mass or less on the basis of the total mass of the release layer. The thermoplastic resin referred to herein serves the function of the peeling-force adjusting agent described above.

Hereinbelow, a release layer 2 that contains a thermally cured resin and a thermoplastic resin as the peeling-force adjusting agent and has a content of the thermoplastic resin in the range of 3% by mass or more and 45% by mass or less on the basis of the total mass of the release layer may be referred to as a release layer of the second aspect. According to a thermal transfer sheet of Second Embodiment having the release layer of the second aspect, it is possible to make the transferability of the transfer layer 10, which is originally required from the release layer 2, satisfactory. Additionally, by setting the content of the thermoplastic resin within the range described above, it is possible to prevent occurrence of tailing when the transfer layer 10 is transferred onto a transfer receiving article. That is, it is possible to make the transferability when the transfer layer 10 is transferred satisfactory and to sufficiently prevent tailing that may occur when the transfer layer 10 is transferred.

The content of the thermoplastic resin contained in the release layer of the second aspect is specified to be 3% by mass or more and 45% by mass or less on the basis of the total mass of the release layer of the second aspect because, when the content of the thermoplastic resin falls below 3% by mass, the adhesion between the release layer of the second aspect and the transfer layer 10 becomes excessively low and thus it is not possible to sufficiently prevent occurrence of tailing when the transfer layer 10 is transferred onto a transfer receiving article. Meanwhile, this is because, when the content of the thermoplastic resin exceeds 45% by mass, the adhesion between the release layer of the second aspect and the transfer layer 10 becomes excessively high and thus when the transfer layer 10 is transferred onto a transfer receiving article, defective transfer in which a portion or the whole of the transfer layer 10 remains on the side of the substrate 1 without being transferred onto the transfer receiving article is more likely to occur. Also, when the content of the thermoplastic resin exceeds 45% by mass, this is because the content of the thermally cured resin as an essential component is reduced correspondingly and thus it is not possible to sufficiently satisfy the transferability of the transfer layer 10. The release layer of the second aspect in a preferred form contains a thermoplastic resin in the range of 15% by mass or more and 30% by mass or less on the basis of the total mass of the release layer of the second aspect.

That is, according to the thermal transfer sheet 100 of Second Embodiment having the release layer of the second aspect, the peeling force when the transfer layer 10 is transferred onto transfer receiving article is optimized by causing the release layer of the second aspect to contain both a thermally cured resin and a thermoplastic resin and additionally specifying the content of the thermoplastic resin within the predetermined range described above. This makes it possible to prevent tailing and to make an improvement in the transferability.

<Thermally Cured Resin>

The release layer of the second aspect contains a thermally cured resin. The thermally cured resin referred to herein means a resin obtained by curing a thermosetting resin by heating. Resins that cure at normal temperature are also included in the thermosetting resin. The release layer of the second aspect may contain one thermally cured resin solely or may contain two or more thermally cured resins.

There is no particular limitation with respect to thermosetting resins for obtaining thermally cured resins, and examples thereof can include compounds (monomers) having two or more two thermosetting functional groups per molecule. Examples of the thermosetting functional group can include an epoxy group, an oxetanyl group, and an isocyanate group. Specific examples thereof can include polyester resins, epoxy resins, thermosetting acryl resins such as epoxy group-containing acryl resins, thermosetting urethane resins, aminoalkyd resins, melamine resins, guanamine resins, and urea resins. Among these thermosetting resins, epoxy group-containing acryl resins are preferred thermosetting resins from the viewpoint of being able to make a further improvement in the solvent resistance and releasability.

According to the release layer of the second aspect containing a thermally cured resin, it is possible to improve the transferability of the transfer layer 10 in comparison with a release layer containing no thermally cured resin. Thus, there is no particular limitation with respect to the content of the thermally cured resin, and the content of the thermally cured resin is preferably in the range of 30% by mass or more and 97% by mass or less, more preferably in the range of 40% by mass or more and 97% by mass or less, particularly preferably in the range of 55% by mass or more and 97% by mass or less, on the basis of the total mass of the release layer of the second aspect. It is possible to make a further improvement in the transferability of the transfer layer 10 by allowing the release layer of the second aspect to contain a thermally cured resin in the preferred range described above.

<Thermoplastic Resin>

The release layer of the second aspect contains a thermoplastic resin. The thermoplastic resin has a function of controlling the adhesion between the release layer of the second aspect and the transfer layer 10. That is, the thermoplastic resin serves the function of a peeling-force adjusting agent. According to the release layer of the second aspect, it is possible to allow the adhesion between the release layer of the second aspect and the transfer layer 10 to sufficiently prevent occurrence of tailing without interfering with the transferability of the transfer layer 10.

There is no particular limitation with respect to the thermoplastic resin, and examples thereof can include cellulose type resins, melamine type resins, polyester type resins, polyamide type resins, polyolefin type resins, thermoplastic acryl type resins, styrene type resins, ethylene-vinyl acetate copolymers, and thermoplastic elastomers such as styrene-butadiene rubber. Among these, it can be said that a release layer of the second aspect containing at least one selected from the group of thermoplastic acrylic type resins, thermoplastic elastomers, rosin ester resins, and polyester resins is a preferred thermoplastic resin in comparison with a release layer of the second aspect containing other thermoplastic resin, from the viewpoint of further improving the effect of preventing occurrence of tailing. The release layer of the second aspect may contain one thermoplastic resin solely or may contain two or more thermoplastic resins.

Examples of the thermoplastic elastomer can include styrene type elastomers, olefin type elastomers, urethane type elastomers, polyester type elastomers, polyamide type elastomers, polyamide type elastomers, 1,2-polybutadiene type elastomers, and vinyl chloride type elastomers.

The release layer of the second aspect preferably contains a thermoplastic resin having a glass transition temperature (Tg) of 30° C. or more and 130° C. or less, as the thermoplastic resin. By forming the release layer of the second aspect that contains a thermoplastic resin having a glass transition temperature (Tg) of 30° C. or more and 130° C. or less, it is possible to sufficiently prevent whitening and the like that may occur on a peeling interface when the transfer layer is transferred to thereby improve the quality of the transfer surface.

In order to further improve the releasability of the transfer layer 10, it is also possible to allow the release layer of the second aspect to contain, for example, waxes, a silicone wax, various silicone-modified resins such as a silicone resin or the like. As a thermosetting resin for obtaining the thermally cured resin described above, it is also possible to use a silicone-modified thermosetting resin such as an epoxy group-containing silicone-modified acryl resin or the like.

There is no particular limitation with respect to the thickness of the release layer of Second Embodiment, and the thickness is preferably in the range of 0.1 μm or more and 5 μm or less, more preferably in the range of 0.5 μm or more and 2 μm or less.

There is also no particular limitation with respect to the method for forming the release layer of the second aspect, and the release layer can be formed by dispersing or dissolving a thermosetting resin, a thermoplastic resin, and additive materials to be added as required in an appropriate solvent to adjust a coating liquid for a release layer, coating the substrate 1 or a layer to be optionally provided between the substrate 1 and the release layer 2 (e.g., an adhesion layer 7 described below) with this coating liquid, and baking the layer at a temperature of 100° C. or more and 200° C. or less.

As described above, in the thermal transfer sheet 100 of Second Embodiment, an improvement in peelability of the transfer layer 10 has been made in a broad peeling environment by inclusion of the release layer of the first aspect or the release layer of the second aspect described above as the release layer 2. Incidentally, in the case in which the release layer 2 (the release layer of the first aspect or the release layer of the second aspect) is provided directly on the substrate 1, if the adhesion (sometimes referred to as adhesion force) between the substrate 1 and the release layer 2 is lower than the adhesion between the release layer 2 and the transfer layer 10, irregular transfer in which the release layer 2, which is originally supposed to remain on the side of the substrate 1, is transferred together with the transfer layer 10 onto the side of a transfer receiving article is more likely to occur.

(Adhesion Layer)

Accordingly, when the adhesion force between the substrate 1 and the release layer 2 is lower than the adhesion force between the release layer 2 and the transfer layer 10, an adhesion layer 7 is preferably provided between the substrate 1 and the release layer 2 such that the adhesion force between the substrate 1 and the release layer 2 becomes higher than the adhesion force between the release layer 2 and the transfer layer 10, as shown in FIG. 2. In other words, it is preferred to provide an adhesion layer 7 between the substrate 1 and the release layer 2 such that the adhesion force between the release layer 2 and the adhesion layer 7 becomes higher than the adhesion force between the release layer 2 and the transfer layer 10. The adhesion layer 7 is an optional constituent in the thermal transfer sheet 100 of Second Embodiment. For example, as described above, when the adhesion force between the substrate 1 and the release layer 2 is higher than the adhesion force between the release layer 2 and the transfer layer 10 due to subjecting the substrate 1 to easily-adhesive treatment, it is not particularly necessary to provide an adhesion layer 7.

The adhesion layer 7 as an example contains a cured resin obtained by allowing a curing agent to act on a binder resin, that is, a cured resin obtained by allowing a curing agent to cure a binder resin (hereinbelow, a cured resin obtained by allowing a curing agent to act on a binder resin is referred to as a cured binder resin). The adhesion layer 7 may contain one cured binder resin solely or may contain two or more cured binder resins.

According to the adhesion layer 7 as an example, it is possible to improve the adhesion between the substrate 1 and the adhesion layer 7 and the adhesion between the adhesion layer 7 and the release layer 2, in other words, it is possible to improve the adhesion force between the substrate 1 and the release layer 2. This makes it possible to allow the adhesion force between the substrate 1 and the release layer 2, which adhere to each other via the adhesion layer 7, to be higher than the adhesion between the release layer 2 and the transfer layer 10 and to prevent irregular transfer caused by a decrease in the adhesion between the substrate 1 and the release layer 2 when the transfer layer 10 is transferred onto a transfer receiving article, irrespective of the type of the substrate 1. Hereinbelow, a cure binder resin contained in the adhesion layer 7 will be described as an example.

<Cured Binder Resin>

There is no particular limitation with respect to the binder resin to obtain a cured binder resin. The resin may be an aqueous binder resin or may be a solvent-based binder resin. Examples of the aqueous binder resin can include polyvinyl pyrrolidone resins, polyvinyl alcohol type resins, polyacrylic acid, polyhydroxyethyl acrylate, water-soluble (or water-dispersible) polyester resins, water-soluble (or water-dispersible) polyurethane resins, water-dispersible vinyl chloride resins, water-dispersible acryloyl chloride type resins, water-dispersible epoxy resins, gelatin, hydroxyethyl cellulose resins, hydroxypropyl cellulose resins, and carboxymethyl cellulose. The aqueous binder resin means a water-soluble resin or a resin that is insoluble in aqueous solvents but is dispersible in aqueous solvents, such as an emulsion and dispersion. Examples of the aqueous solvent can include water and mixed solvents of water and alcohol.

Examples of the solvent-based binder resin can include urethane resins, polyolefin type resins, halogenated resins such as polyvinyl chloride or polyvinylidene chloride, polyvinyl acetate, vinyl chloride-vinyl acetate type copolymers, ethylene-vinyl acetate copolymers, polyvinyl butyral, polyester resins, polystyrene type resins, polyamide type resins, cellulose type resins, polycarbonate, and acryl type resins. The solvent-based binder resin means a resin soluble or dispersible in organic solvents. Examples of the organic solvent for dissolving or dispersing a solvent-based binder resin can include hydrocarbon type solvents such as hexane and pentane, aromatic type solvents such as xylene, toluene, and benzene, ketone type solvents such as methyl ethyl ketone and acetone, alcohol type solvents such as propanol, ethanol, and methanol, or mixed solvents thereof.

Among resins which can be dissolved or dispersed in an organic solvent, there also exist resins which can be dissolved or dispersed also in a aqueous solvent (hereinbelow, a resin which can be dissolved or dispersed both in an organic solvent and a aqueous solvent is referred to as an "amphoteric resin"), but a solvent-based binder resin in this case means a binder resin that is contained in an adhesion layer formed by using a coating liquid for an adhesion layer prepared by dispersing or dissolving an "amphoteric resin" in an organic solvent. Similarly, an aqueous binder resin means a binder resin that is contained in an adhesion layer formed by using a coating liquid for an adhesion layer prepared by dispersing or dissolving an "amphoteric resin" in an aqueous solvent. Identification of the type of the solvent remaining in the adhesion layer 7 makes it possible to distinguish whether the adhesion layer 7 is one formed by using a coating liquid for an adhesion layer prepared by dispersing or dissolving an "amphoteric resin" in an organic solvent or one formed by using a coating liquid for an adhesion layer prepared by dispersing or dissolving an "amphoteric resin" in an aqueous solvent. The type of the solvent can be identified by, for example, the gas chromatography method, or by using an infrared moisture analyzer or a heat-drying moisture analyzer.

In the case where the resin contained in the release layer 2 is a solvent-based binder resin, in other words, in the case where the release layer 2 is formed on the adhesion layer 7 by using a coating liquid for a release layer prepared by dissolving or dispersing a solvent-based resin in an organic solvent, an aqueous binder resin is more preferably used as a binder resin for obtaining the cured binder resin contained in the adhesion layer 7. Meanwhile, in the case in which the resin contained in the release layer 2 is an aqueous binder resin, an aqueous binder resin is preferably used as a binder resin for obtaining the cured binder resin contained in the adhesion layer 7. This combination can reduce mixing of the adhesion layer 7 with the release layer 2 when the release layer 2 is formed on the adhesion layer 7 and thus can further improve the adhesion.

There is no particular limitation with respect to the curing agent to obtain a cured binder resin, and it is only required to appropriately select a curing agent depending on the binder resin to be used. Examples of the curing agent can include isocyanate type curing agents, urethane type curing agents, epoxy type curing agents, melamine type curing agents, urea resin type curing agents, silane coupling agents, metal chelating agents such as titanium chelating agents, zirconium chelating agents, and aluminum chelating agents.

The adhesion layer 7 in a preferred form contains either one or both of a cured polyvinyl alcohol type resin obtained by allowing a curing agent to cure a polyvinyl alcohol type resin and a cured polyurethane type resin obtained by allowing a curing agent to cure a polyurethane type resin. According to the adhesion layer 7 containing a cured polyvinyl alcohol type resin and a cured polyurethane type resin, it is possible to make transfer stability satisfactory, and it is possible to reduce unintentional transfer of the release layer 2 by its satisfactory adhesion.

The polyvinyl alcohol type resin referred in the specification of the present application means a resin containing a vinyl alcohol polymer as a constituent and may be a vinyl alcohol homopolymer or a copolymer with other polymerizing component. In the case where a copolymer of vinyl alcohol and other polymerizing component is used as the polyvinyl alcohol type resin, the copolymerization ratio of the vinyl alcohol in the copolymer is preferably 50% or more. As the polyvinyl alcohol type resin, it is possible to use a modified compound obtained by partially modifying polyvinyl alcohol. The polyurethane type resin referred in the specification of the present application means a resin containing a polymer obtained by reaction of a diisocyanate compound with a diol compound.

There is no limitation with respect to the blend ratio between the binder resin and the curing agent to obtain a cured binder resin, and the blend ratio can be appropriately set depending on the binder resin and the curing agent to be used. For example, in the case where a reactive resin having functional groups that react with a curing agent is used as the binder resin, the amounts of the binder resin and the curing agent to be blended are preferably set such that the equivalence ratio of the total number of the functional groups possessed by the curing agent to the total number of the functional groups possessed by the reactive resin is 0.5 or more and 5 or less. In the case where a polyvinyl alcohol type resin is used as the binder resin as described above and a titanium chelating agent is used as the curing agent in order to form an adhesion layer 7 in a preferred form, the amounts of the binder resin and the curing agent to be blended are preferably set such that the content of the polyvinyl alcohol type resin is in the range of 40% or more and 90% or less on the basis of the total mass of the polyvinyl alcohol type resin and the titanium chelating agent. Alternatively, in the case where a polyurethane type resin is used as the binder resin described above and a silane coupling agent is used as the curing agent, the amounts of the binder resin and the curing agent to be blended are preferably set such that the equivalence ratio of the total number of the functional groups possessed by silane coupling agent to the total number of the functional groups possessed by the polyurethane type resin is of the order of 0.5 or more and 5 or less.

There is no particular limitation with respect to the content of the cured binder resin, and the mass of the cured binder resin (the total mass in the case where two or more cured binder resins are contained) is preferably 50% by mass or more on the basis of the total mass of the adhesion layer 7. Allowing the content of the cured binder resin to be 50% by mass or more can make a further improvement in the adhesion between the release layer 2 and the adhesion layer 7. The upper limit is not limited and is 100% by mass.

There is no particular limitation with respect to the thickness of the adhesion layer 7, and the thickness is preferably in the range of 0.02 µm or more and 3 µm or less. Allowing the thickness of the adhesion layer 7 to be in this range can make a further improvement in the adhesion with the release layer 2. Film formation of a stable adhesion layer 7 also can be achieved.

The adhesion layer 7 may also contain optional components in addition to the cured binder resin as required.

There is no particular limitation with respect to the method for forming the adhesion layer 7, and the adhesion layer 7 can be formed by preparing a coating liquid for an adhesion layer containing a binder resin and a curing agent, coating the substrate 1 with this coating liquid, and drying the liquid.

(Back Face Layer)

Alternatively, on the surface opposite to the surface of the substrate 1 on which the transfer layer 10 is provided, a back face layer (not shown) for the purpose of improving the thermal resistance, driving stability, and the like can be provided. Incidentally, the back face layer is an optional constituent in the thermal transfer sheet 100 of Second Embodiment.

The back face layer may be formed by appropriately selecting a conventionally-known thermoplastic resin and the like. Examples of the thermoplastic resin like this can include thermoplastic resins, such as polyester type resins, polyacrylic acid ester type resins, polyvinyl acetate type resins, styrene acrylate type resins, polyurethane type resins, polyolefin type resins such as polyethylene type resins and polypropylene type resins, polystyrene type resins, polyvinyl chloride type resins, polyether type resins, polyamide type resins, polyimide type resins, polyamide imide type resins, polycarbonate type resins, polyacrylamide resins, polyvinyl chloride resins, polyvinyl butyral resins, polyvinyl acetal resins such as polyvinyl acetoacetal resins, and silicone modified forms of these.

Further, the back face layer preferably contains various additives for the purpose of improving the slipping property, such as a release agent such as waxes, higher fatty acid amides, phosphoric ester compounds, metal soaps, silicone oils, and surfactants, an organic powder such as a fluorine resin, and inorganic particles such as silica, clay, talc, and calcium carbonate, and particularly preferably contains at least one of the phosphoric ester and metal soap.

The back face layer can be formed by dispersing or dissolving, for example, the thermoplastic resin described above and various additive materials to be added as required in an appropriate solvent to adjust a coating liquid for a back face layer, coating the substrate 1 with this coating liquid, and drying the coated liquid. The thickness of the back face layer is preferably in the range of 0.1 µm or more and 5 µm or less, more preferably in the range of 0.3 µm or more and 2.0 µm or less, from the viewpoint of an improvement in the heat resistance or the like.

<Transfer of Transfer Layer>

The method for transferring the transfer layer 10 onto a transfer receiving article by using the thermal transfer sheet 100 of Second Embodiment may be a known transfer method. For example, known methods such as hot stamping by heat inscription (foil pressing), entire surface or stripe transfer by heat rolling, and a thermal printer (also referred to as a thermal transfer printer) by use of a thermal head (heat-sensitive printing head) can be applied.

<Transfer Receiving Article>

There is no limitation with respect to a transfer receiving article onto which the transfer layer 10 of the thermal transfer sheet is to be transferred, and examples thereof can include plastic films such as IC cards and ID cards (the cards may be referred to as card substrates), thermal transfer image-receiving sheets on which a thermally transferable image has been formed, natural fiber paper, coated paper, tracing paper, plastic films, glass, metal, ceramics, woods, and cloths. The transfer receiving article may be one constituted by a single layer or may be one constituted by a plurality of layers.

Examples of the plastic film can include polyester type resins such as polyethylene terephthalate (PET), polybutylene terephthalate (PBT), polyethylene naphthalate (PEN), polyethylene terephthalate-isophthalate copolymers, terephthalic acid-cyclohexanedimethanol-ethylene glycol copolymers, and polyethylene terephthalate/polyethylene naphthalate coextruded films, polyamide type resins such as nylon 6 and nylon 66, polyolefin type resins such as polyethylene, polypropylene, and polymethylpentene, vinyl type resins such as polyvinyl chloride, acryl type resins such as polyacrylate, polymethacrylate, and polymethyl methacrylate, imide type resins such as polyimide and polyether imide, engineering resins such as polyarylate, polysulfone, polyether sulfone, polyphenylene ether, polyphenylene sulfide (PPS), polyaramid, polyether ketone, polyether nitrile, polyether ether ketone, and polyether sulfite, polycarbonate, styrene type resins such as polystyrene, high impact polystyrene, acrylonitrile-styrene copolymers (AS resins), and acrylonitrile-butadiene-styrene copolymers (ABS resins), and cellulose type films such as cellophane, cellulose acetate, and nitrocellulose. The plastic film may be a copolymer resin mainly based on a resin described above or a mixed product (including an alloy).

Additionally, from IC cards, ID cards and the like, designability and a security property are usually required, and thus, it is also possible to use a transfer receiving article on which a print layer, a hologram layer or the like is provided in advance.

EXAMPLES

Hereinbelow, the present invention will be described in further detail with reference to Examples, but the present invention is not intended to be limited to these Examples. Hereinafter, unless otherwise specified, the expression of "part(s)" is/are based on the mass. For components except for solvents, a (part(s) by) mass in terms of solid content is indicated. In each coating liquid for a release layer, a component A means a component as a thermosetting resin, and a component B means a component as a peeling-force adjusting agent.

In forming the thermal transfer sheet of each of Examples and Comparative Examples, a substrate and a coating liquid below were provided.

Substrate 1 . . . polyethylene terephthalate film (thickness 12 µm) (Toray Industries, Inc.)
Substrate 2 . . . polyethylene terephthalate film (thickness 25 µm) (Toray Industries, Inc.)
Substrate 3 . . . film formed by coating one surface of the substrate 1 with a release layer of a melamine type resin
Substrate 4 . . . film formed by coating the release layer of the substrate 3 with a coating liquid A having the following composition by gravure coating so as to achieve a thickness of 0.5 µm after drying <Coating Liquid A>

| Carnauba wax (WE-95, Konish, Co., Ltd.) | 2 parts |
| Polystyrene wax (WE68-284, DIC Graphics Corporation) | 7 parts |
| Styrene-butadiene rubber (LX430, Nippon Zeon Co., Ltd.) | 1 part |
| Water | 50 parts |
| Isopropyl alcohol | 50 parts |

<Coating Liquid for an Adhesion Layer 1>

| Aqueous polyurethane (solid content 35%) (HYDRAN (R)AP-40N, DIC Corporation) | 78.8 parts |
| Epoxy resin (WATERSOL WSA-950, DIC Corporation) | 16.8 parts |
| Antistatic agent (solid content 5%) (aquaPASS-01x, Mitsubishi Rayon Co., Ltd.) | 4.4 parts |
| Water | 300 parts |
| Solvent (Solmix A-11, Japan Alcohol Trading Co., Ltd.) | 1200 parts |

<Coating Liquid for an Adhesion Layer 2>

| Aqueous polyurethane (solid content 35%) (HYDRAN (R)AP-40N, DIC Corporation) | 82.4 parts |
| Epoxy resin (WATERSOL WSA-950, DIC Corporation) | 16.8 parts |
| Water | 300 parts |
| Solvent Solmix A-11, Japan Alcohol Trading Co., Ltd.) | 1200 parts |

<Coating Liquid for an Adhesion Layer 3>

| Aqueous polyurethane (solid content 35%) (HYDRAN (R)AP-40N, DIC Corporation) | 8 parts |
| Epoxy resin (WATERSOL WSA-950, DIC Corporation) | 0.3 parts |
| Water | 10 parts |
| Solvent (Solmix A-11, Japan Alcohol Trading Co., Ltd.) | 50 parts |

<Coating Liquid for a Release Layer 1>

| (A component) silicone acryl resin (CELTOP 226 (solid content 50%), Daicel Chemical Industries, Ltd.) | 67 parts |
| Aluminum catalyst (CELTOP CAT-A (solid content 10%), Daicel Chemical Industries, Ltd.) | 3 parts |
| (B component) acryl resin (hydroxyl value 10.5 mgKOH/g) (BR-87, Mitsubishi Rayon Co., Ltd.) | 30 parts |
| Toluene | 100 parts |
| Methyl ethyl ketone | 200 parts |

<Coating Liquid for a Release Layer 2>

| (A component) silicone acryl resin (CELTOP 226 (solid content 50%), Daicel Chemical Industries, Ltd.) | 67 parts |
| Aluminum catalyst (CELTOP CAT-A (solid content 10%), Daicel Chemical Industries, Ltd.) | 3 parts |
| (B component) acryl resin (hydroxyl value 31 mgKOH/g) (LH-591, Toray Fine Chemicals Co., Ltd) | 30 parts |
| Toluene | 100 parts |
| Methyl ethyl ketone | 200 parts |

<Coating Liquid for a Release Layer 3>

| (A component) silicone acryl resin (CELTOP 226 (solid content 50%), Daicel Chemical Industries, Ltd.) | 86 parts |
| Aluminum catalyst (CELTOP CAT-A (solid content 10%), Daicel Chemical Industries, Ltd.) | 4 parts |
| (B component) acryl resin (hydroxyl value 26 mgKOH/g) (EF32, Soken Chemical & Engineering Co., Ltd.) | 10 parts |
| Toluene | 100 parts |
| Methyl ethyl ketone | 200 parts |

<Coating Liquid for a Release Layer 4>

| (A component) silicone acryl resin (CELTOP 226 (solid content 50%), Daicel Chemical Industries, Ltd.) | 67 parts |
| Aluminum catalyst (CELTOP CAT-A (solid content 10%), Daicel Chemical Industries, Ltd.) | 3 parts |
| (B component) acryl resin (hydroxyl value 26 mgKOH/g) (EF32, Soken Chemical & Engineering Co., Ltd.) | 30 parts |
| Toluene | 100 parts |
| Methyl ethyl ketone | 200 parts |

<Coating Liquid for a Release Layer 5>

| (A component) silicone acryl resin (CELTOP 226 (solid content 50%), Daicel Chemical Industries, Ltd.) | 86 parts |

-continued

| | |
|---|---|
| Aluminum catalyst (CELTOP CAT-A (solid content 10%), Daicel Chemical Industries, Ltd.) | 4 parts |
| (B component) acryl resin (hydroxyl value 8 mgKOH/g) (EF36, Soken Chemical & Engineering Co., Ltd.) | 10 parts |
| Toluene | 100 parts |
| Methyl ethyl ketone | 200 parts |

<Coating Liquid for a Release Layer 6>

| | |
|---|---|
| (A component) silicone acryl resin (CELTOP 226 (solid content 50%), Daicel Chemical Industries, Ltd.) | 67 parts |
| Aluminum catalyst (CELTOP CAT-A (solid content 10%), Daicel Chemical Industries, Ltd.) | 3 parts |
| (B component) acryl resin (hydroxyl value 8 mgKOH/g) (EF36, Soken Chemical & Engineering Co., Ltd.) | 30 parts |
| Toluene | 100 parts |
| Methyl ethyl ketone | 200 parts |

<Coating Liquid for a Release Layer 7>

| | |
|---|---|
| (A component) silicone acryl resin (CELTOP 226 (solid content 50%), Daicel Chemical Industries, Ltd.) | 86 parts |
| Aluminum catalyst (CELTOP CAT-A (solid content 10%), Daicel Chemical Industries, Ltd.) | 4 parts |
| (B component) acryl resin (hydroxyl value 21 mgKOH/g) (EF42, Soken Chemical & Engineering Co., Ltd.) | 10 parts |
| Toluene | 100 parts |
| Methyl ethyl ketone | 200 parts |

<Coating Liquid for a Release Layer 8>

| | |
|---|---|
| (A component) silicone acryl resin (CELTOP 226 (solid content 50%), Daicel Chemical Industries, Ltd.) | 57 parts |
| Aluminum catalyst (CELTOP CAT-A (solid content 10%), Daicel Chemical Industries, Ltd.) | 3 parts |
| (B component) acryl resin (hydroxyl value 21 mgKOH/g) (EF42, Soken Chemical & Engineering Co., Ltd.) | 40 parts |
| Toluene | 100 parts |
| Methyl ethyl ketone | 200 parts |

<Coating Liquid for a Release Layer 9>

| | |
|---|---|
| (A component) silicone acryl resin (CELTOP 226 (solid content 50%), Daicel Chemical Industries, Ltd.) | 86 parts |
| Aluminum catalyst (CELTOP CAT-A (solid content 10%), Daicel Chemical Industries, Ltd.) | 4 parts |
| (B component) rosin ester resin (hydroxyl value 15 mgKOH/g) (A75, Arakawa Chemical Industries, Ltd.) | 10 parts |
| Toluene | 100 parts |
| Methyl ethyl ketone | 200 parts |

<Coating Liquid for a Release. Layer 10>

| | |
|---|---|
| (A component) silicone acryl resin CELTOP 226 (solid content 50%), Daicel Chemical Industries, Ltd.) | 67 parts |
| Aluminum catalyst (CELTOP CAT-A (solid content 10%), Daicel Chemical Industries, Ltd.) | 3 parts |
| (B component) rosin ester resin (hydroxyl value 15 mgKOH/g) (A75, Arakawa Chemical Industries, Ltd.) | 30 parts |
| Toluene | 100 parts |
| Methyl ethyl ketone | 200 parts |

<Coating Liquid for a Release Layer 11>

| | |
|---|---|
| (A component) silicone acryl resin (CELTOP 226 (solid content 50%), Daicel Chemical Industries, Ltd.) | 77 parts |
| Aluminum catalyst (CELTOP CAT-A (solid content 10%), Daicel Chemical Industries, Ltd.) | 3 parts |
| (B component) rosin ester resin (hydroxyl value 15 mgKOH/g) (A125, Arakawa Chemical Industries, Ltd.) | 20 parts |
| Toluene | 100 parts |
| Methyl ethyl ketone | 200 parts |

<Coating Liquid for a Release Layer 12>

| | |
|---|---|
| (A component) silicone acryl resin (CELTOP 226 (solid content 50%), Daicel Chemical Industries, Ltd.) | 67 parts |
| Aluminum catalyst (CELTOP CAT-A (solid content 10%), Daicel Chemical Industries, Ltd.) | 3 parts |
| (B component) rosin ester resin (hydroxyl value 15 mgKOH/g) (A125, Arakawa Chemical Industries, Ltd.) | 30 parts |
| Toluene | 100 parts |
| Methyl ethyl ketone | 200 parts |

<Coating Liquid for a Release Layer 13>

| | |
|---|---|
| (A component) silicone acryl resin (CELTOP 226 (solid content 50%), Daicel Chemical Industries, Ltd.) | 57 parts |
| Aluminum catalyst (CELTOP CAT-A (solid content 10%), Daicel Chemical Industries, Ltd.) | 3 parts |
| (B component) rosin ester resin (hydroxyl value 15 mgKOH/g) (A125, Arakawa Chemical Industries, Ltd.) | 40 parts |
| Toluene | 100 parts |
| Methyl ethyl ketone | 200 parts |

<Coating Liquid for a Release Layer 14>

| | |
|---|---|
| (A component) silicone acryl resin (CELTOP 226 (solid content 50%), Daicel Chemical Industries, Ltd.) | 92.8 parts |
| Aluminum catalyst (CELTOP CAT-A (solid content 10%), Daicel Chemical Industries, Ltd.) | 4.2 parts |
| (B component) polyester resin (hydroxyl value 10 mgKOH/g) (UR-3500, TOYOBO CO., LTD.) | 3 parts |
| Toluene | 100 parts |
| Methyl ethyl ketone | 200 parts |

<Coating Liquid for a Release Layer 15>

| | |
|---|---|
| (A component) silicone acryl resin (CELTOP 226 (solid content 50%), Daicel Chemical Industries, Ltd.) | 92.8 parts |
| Aluminum catalyst (CELTOP CAT-A (solid content 10%), Daicel Chemical Industries, Ltd.) | 4.2 parts |
| (B component) polyester resin (hydroxyl value 310 mgKOH/g) (U-Pica Coat GV990, Japan U-Pica Company Ltd.) | 3 parts |
| Toluene | 100 parts |
| Methyl ethyl ketone | 200 parts |

<Coating Liquid for a Release Layer 16>

| | |
|---|---|
| (A component) silicone acryl resin (CELTOP 226 (solid content 50%), Daicel Chemical Industries, Ltd.) | 86 parts |
| Aluminum catalyst (CELTOP CAT-A (solid content 10%), Daicel Chemical Industries, Ltd.) | 4 parts |
| (B component) polyester resin (hydroxyl value <2.0 mgKOH/g) (Vylon(R) 670, TOYOBO CO., LTD.) | 10 parts |
| Toluene | 100 parts |
| Methyl ethyl ketone | 200 parts |

<Coating Liquid for a Release Layer 17>

| | |
|---|---|
| (A component) silicone acryl resin (CELTOP 226 (solid content 50%), Daicel Chemical Industries, Ltd.) | 94.7 parts |
| Aluminum catalyst (CELTOP CAT-A (solid content 10%), Daicel Chemical Industries, Ltd.) | 4.3 parts |
| (B component) rosin ester resin (hydroxyl value 15 mgKOH/g) (A125, Arakawa Chemical Industries, Ltd.) | 1 parts |
| Toluene | 100 parts |
| Methyl ethyl ketone | 200 parts |

<Coating Liquid for a Release Layer 18>

| | |
|---|---|
| (A component) silicone acryl resin (CELTOP 226 (solid content 50%), Daicel Chemical Industries, Ltd.) | 93.8 parts |
| Aluminum catalyst (CELTOP CAT-A (solid content 10%), Daicel Chemical Industries, Ltd.) | 4.2 parts |
| (B component) rosin ester resin (hydroxyl value 15 mgKOH/g) (A125, Arakawa Chemical Industries, Ltd.) | 2 parts |
| Toluene | 100 parts |
| Methyl ethyl ketone | 200 parts |

<Coating Liquid for a Release Layer 19>

| | |
|---|---|
| (A component) silicone acryl resin (CELTOP 226 (solid content 50%), Daicel Chemical Industries, Ltd.) | 48 parts |
| Aluminum catalyst (CELTOP CAT-A (solid content 10%), Daicel Chemical Industries, Ltd.) | 2 parts |
| (B component) rosin ester resin (hydroxyl value 15 mgKOH/g) (A125, Arakawa Chemical Industries, Ltd.) | 50 parts |
| Toluene | 100 parts |
| Methyl ethyl ketone | 200 parts |

<Coating Liquid for a Release Layer 20>

| | |
|---|---|
| (A component) silicone acryl resin (CELTOP 226 (solid content 50%), Daicel Chemical Industries, Ltd.) | 72 parts |
| Aluminum catalyst (CELTOP CAT-A (solid content 10%), Daicel Chemical Industries, Ltd.) | 3 parts |
| (B component) hydrogenated styrene type thermoplastic elastomer (M1913, Asahi Kasei Chemicals Corporation) | 25 parts |
| Toluene | 100 parts |
| Methyl ethyl ketone | 100 parts |

<Coating Liquid for a Protective Layer 1>

| | |
|---|---|
| Polyfunctional acrylate (NK Ester A-9300, Shin Nakamura Chemical Co., Ltd.) | 20 parts |
| Urethane acrylate (NK Oligomer EA1020, bifunctional, Shin Nakamura Chemical Co., Ltd.) | 20 parts |
| Urethane acrylate (NK Ester U-15HA, pentakaidecafunctional, Shin Nakamura Chemical Co., Ltd.) | 10 parts |
| Reactive binder (unsaturated group-containing) (NK Polymer C24T, Shin Nakamura Chemical Co., Ltd.) | 5 parts |
| Photopolymerization initiator (IRGACURE 907, BASF Japan) | 5 parts |
| Filler (volume-average particle size 12 nm) (MEK-AC2140, Nissan Chemical Industries, Ltd.) | 40 parts |
| Surfactant (acrylic type surfactant) (LF-1984, Kusumoto Chemicals, Ltd.) | 0.1 parts |
| Toluene | 200 parts |
| Methyl ethyl ketone | 200 parts |

<Coating Liquid for a Protective Layer 2>

| | |
|---|---|
| Polyfunctional acrylate (NK Ester A-9300, Shin Nakamura Chemical Co., Ltd.) | 24 parts |
| Urethane acrylate (NK Oligomer EA1020, bifunctional, Shin Nakamura Chemical Co., Ltd.) | 24 parts |
| Urethane acrylate (NK Ester U-15HA, pentakaidecafunctional, Shin Nakamura Chemical Co., Ltd.) | 2 parts |
| Reactive binder (unsaturated group-containing) (NK Polymer C24T, Shin Nakamura Chemical Co., Ltd.) | 5 parts |
| Photopolymerization initiator (IRGACURE 907, BASF Japan) | 5 parts |
| Filler (volume-average particle size 12 nm) (MEK-AC2140, Nissan Chemical Industries, Ltd.) | 40 parts |
| Surfactant (acrylic type surfactant) (LF-1984, Kusumoto Chemicals, Ltd.) | 0.1 parts |
| Toluene | 200 parts |
| Methyl ethyl ketone | 200 parts |

<Coating Liquid for a Protective Layer 3>

| | |
|---|---|
| Polyfunctional acrylate (NK Ester A-9300, Shin Nakamura Chemical Co., Ltd.) | 24 parts |
| Urethane acrylate (NK Oligomer EA1020, bifunctional, Shin Nakamura Chemical Co., Ltd.) | 24 parts |
| Urethane acrylate (NK Ester U-15HA, pentakaidecafunctional, Shin Nakamura Chemical Co., Ltd.) | 2 parts |
| Reactive binder (unsaturated group-containing) (NK Polymer C24T, Shin Nakamura Chemical Co., Ltd.) | 5 parts |
| Photopolymerization initiator (IRGACURE 907, BASF Japan) | 5 parts |

-continued

| Filler (silica particles (volume-average particle size 700 nm)) (XC99-A8808, Momentive Performance Materials Japan LLC) | 40 parts |
| --- | --- |
| Toluene | 200 parts |
| Methyl ethyl ketone | 200 parts |

<Coating Liquid for an Intermediate Layer>

| Polyester resin (Vylon(R) 200, TOYOBO CO., LTD.) | 3.3 parts |
| --- | --- |
| Vinyl chloride-vinyl acetate copolymer (SOLBIN(R) CNL, Nissin Chemical Co., Ltd.) | 2.7 parts |
| Isocyanate curing agent (XEL curing agent, DIC Graphics Corporation) | 1.5 parts |
| Methyl ethyl ketone | 6.7 parts |
| Toluene | 3.3 parts |

<Coating Liquid for a Receiving Layer>

| Vinyl chloride-vinyl acetate copolymer (SOLBIN(R) CNL, Nissin Chemical Co., Ltd.) | 95 parts |
| --- | --- |
| Epoxy-modified silicone oil (KP-1800U, Shin-Etsu Chemical Co., Ltd.) | 5 parts |
| Toluene | 200 parts |
| Methyl ethyl ketone | 200 parts |

<Coating Liquid for an Adhesive Layer>

| Polyester resin (Vylon(R) 700, TOYOBO CO., LTD.) | 100 parts |
| --- | --- |
| Toluene | 200 parts |
| Methyl ethyl ketone | 200 parts |

Example 1

A polyethylene terephthalate (PET) film having a thickness of 12 μm was coated with a coating liquid for an adhesion layer 1 having the above composition by gravure coating so as to achieve a thickness of 0.6 μm in a dried state and dried to thereby form an adhesion layer. Then, this adhesion layer was coated with a coating liquid for a release layer 1 having the above composition by gravure coating so as to achieve a thickness of 0.8 μm in a dried state and dried to thereby form a release layer. Then, this release layer was coated with a coating liquid for a protective layer having the above composition by gravure coating so as to achieve a thickness of 5 μm in a dried state and dried. Then the dried layer was irradiated with ultraviolet rays (light exposure (220 mJ/cm$^2$)) by using a UV exposure apparatus (Fusion UV, F600V, LH10 lamp, H valve, cold type reflective mirror) to form a protective layer. Then, the protective layer was coated with a coating liquid for an intermediate layer having the above composition by gravure coating so as to achieve a thickness of 1 μm in a dried state and dried to thereby form an intermediate layer. The intermediate layer was coated with a coating liquid for a receiving layer having the above composition by gravure coating so as to achieve a thickness of 2.4 μm in a dried state and dried to form a receiving layer. Thus, the thermal transfer sheet of Example 1 was obtained in which the adhesion layer and the release layer are provided on the substrate, the transfer layer is provided on the release layer, and the transfer layer has the protective layer, the intermediate layer, and the receiving layer layered in this order from the side of the release layer.

(Thermal Transfer Sheets of Examples 2 to 19 and Comparative Examples 1 to 8)

The substrate and coating liquids used for formation of the thermal transfer sheet of Example 1 described above and the thickness in a dried state of each layer (film thickness) were respectively replaced by a substrate, coating liquid, and thickness in a dried state (film thickness) as shown in Table 1 below to obtain a thermal transfer sheet of each of Examples and Comparative Examples. In each of Examples 18 and 19, the coating liquid for a receiving layer was replaced by a coating liquid for an adhesive layer having the above composition to thereby form an intermediate layer.

TABLE 1

| | | Adhesion layer | | Release layer | | | | Protective layer | | Receiving layer/ adhesive layer | |
| --- | --- | --- | --- | --- | --- | --- | --- | --- | --- | --- | --- |
| | | Coating liquid | | Coating liquid | | Peeling-force adjusting agent | | Coating layer | | | |
| | Substrate | for an adhesion layer | Film thickness (μm) | for a release layer | Film thickness (μm) | Hydroxyl value (mgKOH/g) | Content (%) | for a protective layer | Film thickness (μm) | Coating liquid type | Film thickness (μm) |
| Example 1 | 1 | 1 | 0.6 | 1 | 0.8 | 10.5 | 30 | 1 | 5.0 | Receiving layer | 2.4 |
| Example 2 | 1 | 1 | 0.6 | 2 | 0.8 | 31 | 30 | 1 | 5.0 | Receiving layer | 2.4 |
| Example 3 | 1 | 2 | 0.6 | 3 | 0.8 | 26 | 10 | 1 | 5.0 | Receiving layer | 2.4 |
| Example 4 | 1 | 2 | 0.6 | 4 | 0.8 | 26 | 30 | 1 | 5.0 | Receiving layer | 2.4 |
| Example 5 | 1 | 2 | 0.6 | 5 | 0.8 | 8 | 10 | 1 | 5.0 | Receiving layer | 2.4 |
| Example 6 | 1 | 2 | 0.6 | 6 | 0.8 | 8 | 30 | 1 | 5.0 | Receiving layer | 2.4 |
| Example 7 | 1 | 2 | 0.6 | 7 | 0.8 | 21 | 30 | 1 | 5.0 | Receiving layer | 2.4 |
| Example 8 | 1 | 2 | 0.6 | 8 | 0.8 | 21 | 40 | 1 | 5.0 | Receiving layer | 2.4 |
| Example 9 | 1 | 2 | 0.6 | 9 | 0.8 | 15 | 10 | 1 | 5.0 | Receiving layer | 2.4 |
| Example 10 | 1 | 2 | 0.6 | 10 | 0.8 | 15 | 30 | 1 | 5.0 | Receiving layer | 2.4 |
| Example 11 | 1 | 2 | 0.6 | 11 | 0.8 | 15 | 20 | 1 | 5.0 | Receiving layer | 2.4 |
| Example 12 | 1 | 2 | 0.6 | 12 | 0.8 | 15 | 30 | 1 | 5.0 | Receiving layer | 2.4 |
| Example 13 | 1 | 2 | 0.6 | 13 | 0.8 | 15 | 40 | 1 | 5.0 | Receiving layer | 2.4 |
| Example 14 | 1 | 2 | 0.6 | 11 | 0.8 | 15 | 20 | 2 | 5.0 | Receiving layer | 2.4 |
| Example 15 | 1 | 2 | 0.6 | 11 | 0.8 | 15 | 20 | 3 | 5.0 | Receiving layer | 2.4 |
| Example 16 | 1 | 2 | 0.6 | 11 | 0.8 | 15 | 20 | 2 | 7.0 | Receiving layer | 2.4 |
| Example 17 | 1 | 2 | 0.6 | 14 | 0.8 | 10 | 3 | 1 | 5.0 | Receiving layer | 2.4 |
| Example 18 | 2 | 2 | 0.6 | 11 | 0.8 | 15 | 20 | 1 | 5.0 | Adhesive layer | 0.5 |
| Example 19 | 2 | 2 | 0.6 | 11 | 0.8 | 15 | 20 | 1 | 7.0 | Adhesive layer | 0.5 |

TABLE 1-continued

| | | Adhesion layer | | Release layer | | | | Protective layer | | Receiving layer/adhesive layer | |
| | | Coating liquid | | Coating liquid | | Peeling-force adjusting agent | | Coating layer | | | |
| | Substrate | Coating liquid for an adhesion layer | Film thickness (μm) | Coating liquid for a release layer | Film thickness (μm) | Hydroxyl value (mgKOH/g) | Content (%) | Coating liquid for a protective layer | Film thickness (μm) | Coating liquid type | Film thickness (μm) |
|---|---|---|---|---|---|---|---|---|---|---|---|
| Comp. Ex. 1 | 3 | Not formed | — | Not formed | — | — | — | 1 | 5.0 | Receiving layer | 2.4 |
| Comp. Ex. 2 | 1 | 2 | 0.6 | Not formed | — | — | — | 1 | 5.0 | Receiving layer | 2.4 |
| Comp. Ex. 3 | 4 | Not formed | — | Not formed | — | — | — | 1 | 5.0 | Receiving layer | 2.4 |
| Comp. Ex. 4 | 1 | 2 | 0.6 | 17 | 0.8 | 15 | 1 | 1 | 5.0 | Receiving layer | 2.4 |
| Comp. Ex. 5 | 1 | 2 | 0.6 | 18 | 0.8 | 15 | 2 | 1 | 5.0 | Receiving layer | 2.4 |
| Comp. Ex. 6 | 1 | 2 | 0.6 | 19 | 0.8 | 15 | 50 | 1 | 5.0 | Receiving layer | 2.4 |
| Comp. Ex. 7 | 1 | 2 | 0.6 | 15 | 0.8 | 310 | 3 | 1 | 5.0 | Receiving layer | 2.4 |
| Comp. Ex. 8 | 1 | 2 | 0.6 | 16 | 0.8 | <2 | 10 | 1 | 5.0 | Receiving layer | 2.4 |

Example 20

A polyethylene terephthalate (PET) film having a thickness of 12 μm was coated with a coating liquid for an adhesion layer 3 having the above composition by gravure coating so as to achieve a thickness of 0.1 μm in a dried state and dried to thereby form an adhesion layer. Then, this adhesion layer was coated with a coating liquid for a release layer 20 having the above composition by gravure coating so as to achieve a thickness of 1 μm in a dried state and dried to thereby form a release layer. Then, this release layer was coated with a coating liquid for a protective layer having the above composition by gravure coating so as to achieve a thickness of 4 μm in a dried state and dried. Then the dried layer was irradiated with ultraviolet rays (light exposure (220 mJ/cm$^2$)) by using a UV exposure apparatus (Fusion UV, F600V, LH10 lamp, H valve, cold type reflective mirror) to form a protective layer. Then, the protective layer was coated with a coating liquid for a receiving layer having the above composition by gravure coating so as to achieve a thickness of 2 μm in a dried state and dried to form a receiving layer. Thus, the thermal transfer sheet of Example 20 was obtained in which the adhesion layer and the release layer are provided on the substrate, the transfer layer is provided on the release layer, and the transfer layer has the protective layer and the receiving layer layered in this order from the side of the release layer.

(Calculation of Initial Breakage Peeling Force)

The thermal transfer sheet of each of Examples and Comparative Examples was cut into a 6.5 cm-wide strip. The cut strip of the thermal transfer sheet of each of Examples and Comparative Examples was affixed onto a Hot stage (HP2000, Shinto Scientific Co., Ltd.) temperature-controlled at 30° C. using transparent double-sided tape (Nice tuck NW-15, Nichiban Co., Ltd.) such that the surface of the Hot stage and the surface of the transfer layer were opposed to each other. In a state in which the temperature of the thermal transfer sheet was kept at 30° C., the transfer layer of the affixed thermal transfer sheet was peeled off under conditions including a peeling angle of 90° and a peel rate of 5 mm/sec from the side of the substrate of the thermal transfer sheet, and the peeling forces in the range from the initial peel portion (see FIG. 3) as the starting point to a point 5 mm (5 mm exclusive) distant in the peeling direction from the starting point were continuously measured with a peeling force meter (Digital Force Gauge DPX-5, IMADA CO., LTD.). The value having the maximum peeling force in this measurement range was divided by the width of the thermal transfer sheet (6.5 cm) to calculate the initial breakage peeling force. The initial breakage peeling force each at 50° C. and 70° C. was calculated in the same manner. The measurement results are shown in Table 2. Note that the transparent double-sided tape is used to affix the Hot stage and the thermal transfer sheet with each other over a length of 15 mm from the initial peel portion (see FIG. 3) as the starting point in the peeling direction.

(Calculation of Peeling Force in a Stable Period)

After the initial breakage peeling force described above was measured, in a state in which the temperature of the thermal transfer sheet was kept at 30° C., the transfer layer of this thermal transfer sheet was peeled off under conditions including a peeling angle of 90° and a peel rate of 5 mm/sec from the side of the substrate of the thermal transfer sheet, and the peeling forces from a point 5 mm distant in the peeling direction from the initial peel portion (see FIG. 3) to a point 15 mm distant in the peeling direction from the initial peel portion (peel length: 10 mm) were continuously measured by using a peeling force meter (Digital Force Gauge DPX-5, IMADA CO., LTD.). The value having the maximum peeling force in this measurement range was divided by the width of the thermal transfer sheet (6.5 cm) to calculate the peeling force in a stable period. The peeling force in a stable period each at 50° C. and 70° C. was measured in the same manner. The measurement results are shown in Table 2.

(Peelability Evaluation)

A thermal transfer ribbon for HDP5000 (HID Global Corporation) was used to form a thermally transferable image on the transfer layer of the thermal transfer sheet of each of Examples and Comparative Examples. Then, the transfer layer of the thermal transfer sheet of each of Examples and Comparative Examples on which a thermally transferable image was formed by an HDP5000 (HID Global Corporation) under conditions including heat roller surface temperature: 185° C. and rate: 2.0 sec/inch was transferred onto a card substrate having the following composition. The thermal transfer sheet before the transfer layer was peeled off (object including the card substrate and thermal transfer sheet integrated) was stored in a constant temperature and humidity chamber controlled at 23° C. (COLONIA CH321PA, Kusumoto Chemicals, Ltd.). In a state in which the surface temperature of the thermal transfer sheet was controlled at 23° C. in the constant temperature and humidity chamber, the transfer layer was peeled off to obtain a print of each of Examples and Comparative Examples. The peelability of transfer layer at this time was visually checked, and the peelability evaluation was carried out based on the following evaluation criteria. The transfer layer of the thermal transfer sheet of each of Examples and Comparative Examples was transferred onto a card substrate having the following composition. The thermal transfer sheet before the transfer layer was peeled off (object including the card substrate and thermal transfer sheet integrated) was stored in the constant temperature and humidity chamber controlled at 50° C. In a state in which the surface temperature of the thermal transfer sheet was controlled at 50° C. in the constant temperature and humidity chamber, the transfer layer was peeled off to obtain a print of each of Examples and Comparative Examples, which print was evaluated in the same manner. The evaluation results are also shown in Table 2.

<Composition of Card Substrate>

| | |
|---|---|
| Polyvinyl chloride compound (degree of polymerization 800) (containing 10% additives such as a stabilizer) | 100 parts |
| White pigment (titanium oxide) | 10 parts |
| Plasticizer (dioctyl phthalate) | 0.5 parts |

"Evaluation Criteria"
A: Only the transfer layer has been transferred onto the side of the card substrate.
B: An area of 50% or less of the release layer has been transferred together with the transfer layer onto the side of the card substrate.
NG: An area of more than 50% of the release layer has been transferred together with the transfer layer onto the side of the card substrate.

(Tailing Evaluation)
The presence of tailing of the transfer layer under the above transfer conditions was visually checked, and the tailing evaluation was carried out based on the following evaluation criteria. The evaluation results are also shown in Table 2.

"Evaluation Criteria"
A: Little tailing occurs (1 mm or less).
B: Tailing occurs (larger than 1 mm and 2 mm or less).
NG: Tailing considerably occurs (larger than 2 mm).

TABLE 2

| | Peeling force | | | | | | Evaluation results | | | |
|---|---|---|---|---|---|---|---|---|---|---|
| | Peeling force in a stable period (g/cm) | | | Initial breakage peeling force (g/cm) | | | Low temperature environment (23° C. environment) | | High temperature environment (50° C. environment) | |
| | 30° C. | 50° C. | 70° C. | 30° C. | 50° C. | 70° C. | Peelability | Tailing | Peelability | Tailing |
| Example 1 | 5.2 | 5.2 | 4.8 | 23.5 | 21.8 | 21.2 | A | A | A | A |
| Example 2 | 22.5 | 17.4 | 13.2 | 38.0 | 44.2 | 40.6 | A | A | A | A |
| Example 3 | 10.0 | 6.8 | 4.8 | 16.2 | 16.6 | 15.2 | A | A | A | A |
| Example 4 | 15.4 | 13.8 | 10.5 | 32.5 | 36.8 | 37.1 | A | A | A | A |
| Example 5 | 8.5 | 5.2 | 4.8 | 18.6 | 18.2 | 15.1 | A | A | A | B |
| Example 6 | 22.8 | 13.2 | 9.2 | 21.7 | 21.1 | 17.5 | A | A | A | A |
| Example 7 | 18.3 | 16.2 | 10.8 | 31.7 | 33.4 | 37.7 | A | A | A | A |
| Example 8 | 12.9 | 10.0 | 10.3 | 61.7 | 59.5 | 54.8 | B | A | B | A |
| Example 9 | 10.9 | 6.0 | 4.9 | 18.0 | 17.5 | 16.6 | A | A | A | A |
| Example 10 | 15.1 | 11.5 | 8.3 | 44.3 | 41.1 | 32.2 | A | A | A | A |
| Example 11 | 6.9 | 6.2 | 5.2 | 25.5 | 24.3 | 25.8 | A | A | A | A |
| Example 12 | 12.9 | 12.0 | 8.6 | 24.2 | 26.0 | 27.2 | A | A | A | A |
| Example 13 | 15.5 | 15.1 | 13.4 | 26.0 | 24.3 | 30.9 | A | A | A | A |
| Example 14 | 10.9 | 8.9 | 6.9 | 28.8 | 30.2 | 30.9 | A | A | A | A |
| Example 15 | 11.7 | 10.6 | 7.8 | 34.2 | 34.9 | 36.3 | A | A | A | A |
| Example 16 | 12.8 | 10.0 | 9.4 | 30.5 | 34.3 | 38.6 | A | A | A | A |
| Example 17 | 8.9 | 7.1 | 6.3 | 30.5 | 34.3 | 34.0 | A | A | A | A |
| Example 18 | 10.0 | 9.8 | 7.4 | 27.1 | 28.8 | 30.5 | A | A | A | A |
| Example 19 | 8.3 | 7.5 | 7.2 | 27.5 | 26.8 | 28.3 | A | A | A | A |
| Example 20 | 7.2 | 9.5 | 9.5 | 11.6 | 10.3 | 13.3 | A | A | A | A |
| Comp. Ex. 1 | 2.3 | 2.3 | 2.3 | Not measurable | Not measurable | Not measurable | A | NG | A | NG |
| Comp. Ex. 2 | 2.3 | 2.9 | 2.8 | 14.8 | 12.3 | 15.5 | A | NG | A | NG |
| Comp. Ex. 3 | 33.8 | 28.6 | 21.2 | 61.2 | 86.6 | 107.4 | NG | A | NG | A |
| Comp. Ex. 4 | 3.5 | 3.2 | 2.3 | 58.4 | 66.2 | 56.2 | NG | B | NG | NG |
| Comp. Ex. 5 | 3.5 | 3.2 | 2.3 | 52.3 | 60.8 | 83.1 | NG | B | NG | NG |
| Comp. Ex. 6 | 28.8 | 26.9 | 23.1 | 32.3 | 42.5 | 39.2 | NG | A | NG | A |
| Comp. Ex. 7 | 28.6 | 32.3 | 38 | Not measurable | Not measurable | Not measurable | NG | B | NG | B |
| Comp. Ex. 8 | 2.1 | 1.9 | 1.8 | 15.3 | 14.2 | 13.8 | A | NG | A | NG |

REFERENCE SIGNS LIST 100 thermal transfer sheet
1 substrate
2 release layer
3 protective layer
5 adhesive layer, layer functioned both as a receiving layer and an adhesive layer
7 adhesion layer
10 transfer layer

The invention claimed is:
1. A thermal transfer sheet comprising:
a substrate;
a release layer provided on one surface of the substrate; and
a transfer layer provided on the release layer;
wherein the transfer layer is provided peelably from the release layer, wherein the release layer contains a silicone resin and a peeling-force adjusting agent, wherein the peeling-force adjusting agent is at least one material selected from the group consisting of thermoplastic elastomers, rosin ester resins and polyester resins, and wherein a peeling force in a stable period is in a range of 4.6 g/cm or more and 23 g/cm or less when the transfer layer is peeled off at a peeling temperature in a range of 30° C. or more and 70° C. or less and at a peeling angle of 90° while a surface of the transfer layer on a side opposite to the substrate serves as a peeling interface.

2. The thermal transfer sheet according to claim 1, wherein a content of the peeling-force adjusting agent is in a range of 3% by mass or more to 45% by mass or less based on a total mass of the release layer.

3. The thermal transfer sheet according to claim 1, wherein a content of the peeling-force adjusting agent is in a range of 10% by mass or more to 45% by mass or less based on a total mass of the release layer.

4. The thermal transfer sheet according to claim 1, wherein the peeling-force adjusting agent is a hydroxyl group-containing resin having a hydroxyl value in a range of 3mgKOH/g or more to 100 mgKOH/g or less.

5. The thermal transfer sheet according to claim 1, wherein the peeling-force adjusting agent is a hydroxyl group-containing resin having a hydroxyl value in a range of 3mgKOH/g or more to 31 mgKOH/g or less.

6. The thermal transfer sheet according to claim 1, wherein the peeling-force adjusting agent is a thermoplastic resin have a glass transition temperature (Tg) in a range of 30° C. or more to 130° C. or less.

7. The thermal transfer sheet according to claim 1, further comprising an adhesion layer provided between the substrate and the release layer, wherein an adhesion force between the release layer and the adhesion layer is higher than an adhesion force between the release layer and the transfer layer.

8. The thermal transfer sheet according to claim 1, wherein the transfer layer has a single-layer structure including only a protective layer, or is a layered structure including the protective layer.

9. The thermal transfer sheet according to claim 1, wherein the transfer layer has a layered structure in which a protective layer and a receiving layer are layered, in this order, from a side of the substrate.

* * * * *